(12) United States Patent
Yamada et al.

(10) Patent No.: US 7,821,690 B2
(45) Date of Patent: Oct. 26, 2010

(54) INFORMATION PROCESSING APPARATUS, IMAGE FORMING APPARATUS AND METHOD, AND STORAGE MEDIUM READABLE BY COMPUTER THEREFOR

(75) Inventors: Kazutaka Yamada, Aichi-ken (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1249 days.

(21) Appl. No.: 11/277,497

(22) Filed: Mar. 25, 2006

(65) Prior Publication Data
US 2006/0232836 A1 Oct. 19, 2006

(30) Foreign Application Priority Data
Mar. 28, 2005 (JP) ............................. 2005-092120

(51) Int. Cl.
 G03F 3/10 (2006.01)
 H04N 1/46 (2006.01)
(52) U.S. Cl. ..................... 358/527; 358/537; 358/538
(58) Field of Classification Search ................. 358/527, 358/537, 538
See application file for complete search history.

(56) References Cited

U.S. PATENT DOCUMENTS 7,330,285 B2 2/2008 Nakagawa et al.

FOREIGN PATENT DOCUMENTS

| JP | H07-021067 A | 1/1995 |
| JP | H11-215482 A | 8/1999 |
| JP | 2000-324333 A | 11/2000 |
| JP | 2002-165079 A | 6/2002 |
| JP | 2003/067153 | * 3/2003 |
| JP | 2003-067153 A | 3/2003 |
| JP | 2004-064212 A | 2/2004 |

OTHER PUBLICATIONS

Japanese Patent Office, Office Action for Japanese Application No. 2005-092120, mailed Jul. 29, 2008. (counterpart to above captioned U.S. patent application) (partial translation).
Patent Office of the People's Republic of China, Notification of First Office Action for Chinese Patent Application No. 2006100584893 (counterpart to above-captioned patent application), dated Sep. 19, 2008.
Japan Patent Office, Office Action for Japanese Application No. 2004-381924, mailed Aug. 12, 2008 (partial translation).

* cited by examiner

*Primary Examiner*—Charlotte M Baker
(74) *Attorney, Agent, or Firm*—Baker Botts L.L.P.

(57) ABSTRACT

An information processing apparatus includes: a display unit displaying an image; an input unit inputting a command in accordance with an external operation; an image data acquiring unit acquiring print image data from an application; a preview display processing unit displaying on the display unit a first print preview image of the print image data acquired by the image data acquiring unit; a selection region display processing unit capable of selecting a predetermined region of the first print preview image displayed on the display unit by the preview display processing unit and displaying the selected region so as to be identified on the display unit, on the basis of the command in accordance with the input external operation; an image data processing unit processing the print preview image in a unit of an image in the selected region displayed on the display unit by the selection region display processing unit; and a print instructing unit instructing a print unit to print the print preview image.

27 Claims, 25 Drawing Sheets

DIVISION 1, 3, 4, 6, 7, 9: x DIRECTIONAL NON-IMPORTANT REGION
DIVISION 2, 5, 8: x DIRECTIONAL IMPORTANT REGION
DIVISION 1, 2, 3, 7, 8, 9: y DIRECTIONAL NON-IMPORTANT REGION
DIVISION 4, 5, 6: y DIRECTIONAL IMPORTANT REGION

INFORMATION PROCESSING APPARATUS, IMAGE FORMING APPARATUS AND METHOD, AND STORAGE MEDIUM READABLE BY COMPUTER THEREFOR

CROSS-REFERENCE TO RELATED APPLICATION

This application is based on and claims the benefit of priority from the prior Japanese Patent Application No. 2005-92120, filed on Mar. 28, 2005; the entire contents of which are incorporated herein by reference.

TECHNICAL FIELD

The present invention relates to an information processing apparatus which displays a print preview image and a storage medium readable by computer therefor.

The present invention also relates to an image processing apparatus which converts a document into two-dimensional image data such that an image forming apparatus can form an image and outputs the converted two-dimensional image data as input data to the image forming apparatus, to a program for the same, and to a method of outputting the two-dimensional image data.

BACKGROUND

According to a related art, a web browser and a word processor, have a function capable of checking a print image by displaying a print preview image on a display screen before an image displayed on the display screen is printed by a print device.

According to another related art, a printing method of a document created by a personal computer (hereinafter, referred to as 'PC') or a public document on the network (for example, internet), there has been known a method of converting a document to be printed into two-dimensional image data (bitmap data, etc.) such that a print device can print the document and forming an image based on the two-dimensional image data by using the print device.

In addition, as a method of generating two-dimensional image data, a technique of converting a document to be printed into the two-dimensional image data in accordance with the width of a paper used during the print has been known.

SUMMARY

However, the image to be printed may have unnecessary print images when printing an image of an application. For example, when a user wants to print only a part of a picture among images of a web page including pictures and sentences, the other parts of the picture and the sentence are unnecessary.

In this case, in an application, such as a web browser, that a user can not edit original data, there are problems in that the user should print the image having unnecessary images for the print and a color material such as a toner or an ink of the print device is wastefully consumed. Further, according to some application, even though the application has a function for printing only a selected part (highlighted by, for example, dragging a mouse) on the display screen, it can select data (picture or text) recognized on the display screen only in a bundle. Therefore, it is difficult to select only a part of the picture. As a result, according to the related art, it is difficult to exclude unnecessary images.

On the other hand, in the application such as the word processor that the user can edit the original data, it is possible to print only a desired part by editing the original data so as to delete the unnecessary image. However, it is bothersome to temporarily edit the original data in order to print.

Further, in the configuration according to the related art, even though it is possible to change the layout in the unit of image corresponding to one page, it is difficult to exclude the unnecessary parts included in the image corresponding to one page.

In the method of generating two-dimensional image data according to another related art, a document to be printed is uniformly reduced or enlarged in a horizontal direction in accordance with the width of a paper. Accordingly, in the case that the paper is small with respect to an amount of the document, characters to be printed on the paper becomes too small for a user to read the printed document.

In particular, a web page created by using an HTML document includes information, such as an advertisement image, which is not necessary for a user, or link information which is necessary during the web surfing but not necessary during the print. If the unnecessary information is uniformly converted into the same two-dimensional image data, the advertisement image occupies a large portion of a print region so that it is difficult for the user to read the printed web page.

The present invention has been made in view of the above circumstances and provides an information processing apparatus and a computer-readable storage medium to prevent an unnecessary part included in an image to be printed from being printed, and also provides an image processing apparatus capable of converting a document into two-dimensional image data such that a user can more easily read a predetermined region of the document than another region when forming an image, a computer readable storage medium for the same, and a method of outputting the image data.

According to an aspect of the invention, an information processing apparatus includes: a display unit displaying an image; an input unit inputting a command in accordance with an external operation; an image data acquiring unit acquiring print image data from an application; a preview display processing unit displaying on the display unit a first print preview image of the print image data acquired by the image data acquiring unit; a selection region display processing unit capable of selecting a predetermined region of the first print preview image displayed on the display unit by the preview display processing unit and displaying the selected region so as to be identified on the display unit, on the basis of the command in accordance with the input external operation; an image data processing unit processing the print preview image in a unit of an image in the selected region displayed on the display unit by the selection region display processing unit; and a print instructing unit instructing a print unit to print the print preview image.

According to another aspect of the invention, an image processing apparatus comprises: a first conversion unit converting a document specified by an external command into two-dimensional image data with which an image forming apparatus can form an image; a size determination unit that determines whether or not a horizontal width of the two-dimensional image data is less than or equal to a horizontal width predetermined in accordance with a capability of the image forming apparatus; a determination unit that determines a first region within the specified document; a second conversion unit that, in a case where the size determination unit determines that the horizontal width of the two-dimensional image data is not less than or equal to the predetermined horizontal widths executes prior to the first region a first reduction process for a second region except for the first region in a horizontal direction, and converts the specified document into two-dimensional image data having a horizontal width less than or equal to the predetermined horizontal width; and an output unit that outputs the two-dimensional image data generated by the first conversion unit as input data to the image forming apparatus in a case where the size determination unit determines that the horizontal width of the two-dimensional image data converted by the first conversion unit is less than or equal to the predetermined horizontal width, and outputs the two-dimensional image data generated by the second conversion unit as input data to the image forming apparatus in a case where the size determination unit determines that the horizontal width of the two-dimensional image data converted by the first conversion unit is not less than or equal to the predetermined horizontal width.

BRIEF DESCRIPTION OF THE DRAWINGS

These and other objects and advantages of this invention will become more fully apparent from the following detailed description taken with the accompanying drawings in which.

DESCRIPTION OF ILLUSTRATIVE ASPECTS

Hereinafter, illustrative aspects will be described with reference to the drawings.

[1. Entire Configuration]

Figure 1:
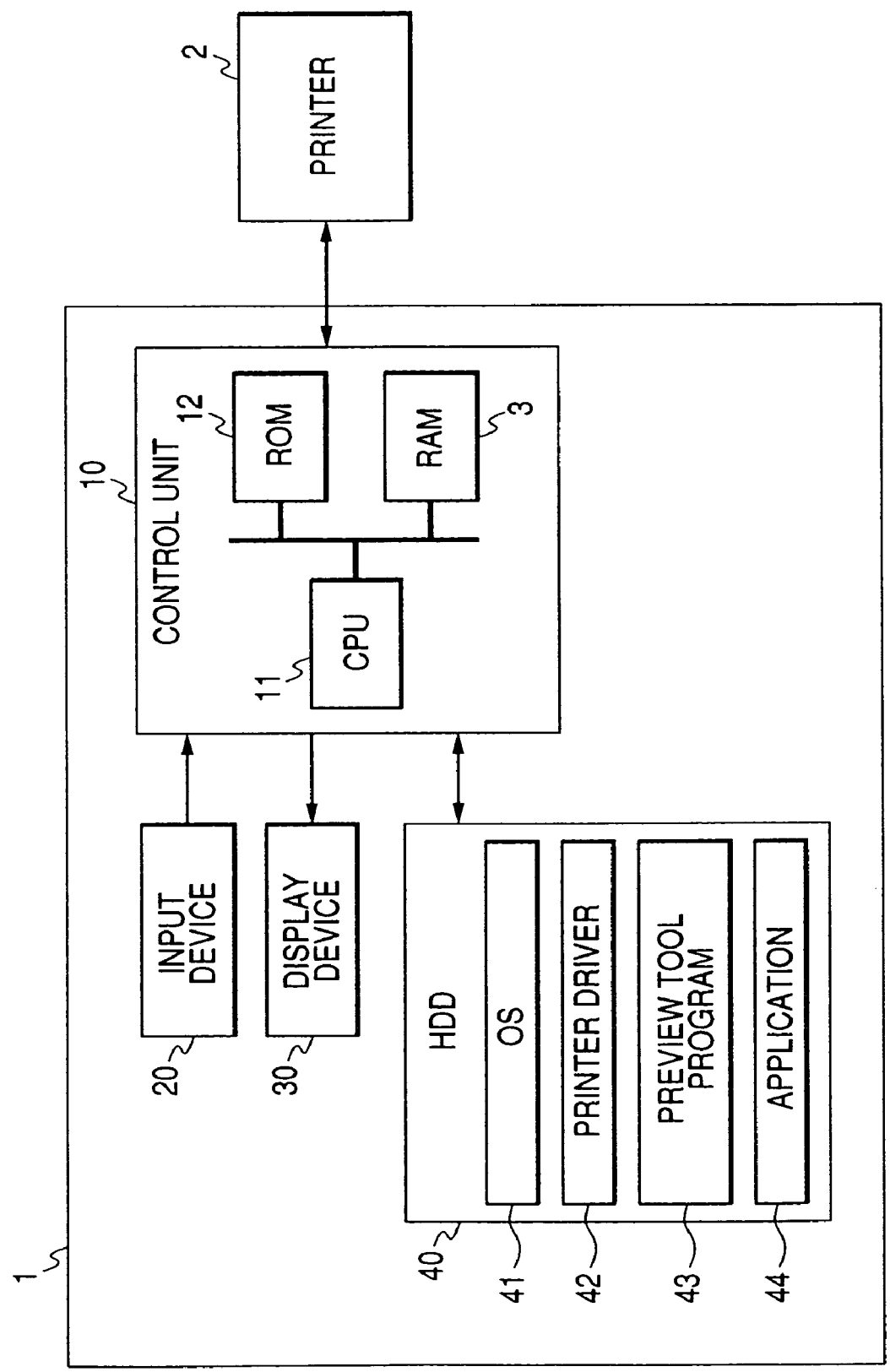
FIG. 1 is a block diagram illustrating a schematic configuration of a personal computer according to an illustrative aspect.

FIG. 1 is a block diagram illustrating a schematic configuration of a personal computer (hereinafter, referred to as PC) 1 serving as an information processing apparatus according to an illustrative aspect.

As shown in FIG. 1, the PC 1 includes a control unit 10, an input device 20, a display device 30, and hard disk 40.

The control unit 10 includes a CPU 11, a ROM 12, a RAM 13, and so on, and generally controls the entire PC 1.

The input device 20 inputs a command in accordance with the external operation by a user to the control unit 10. In the illustrative aspect, a keyboard or a pointing device (such as a mouse) is used as the input device 20.

The display device 30 is connected to an image processing circuit (not shown) included in the control unit 10 and displays an image indicating data output from the control unit 10 on a display screen. In the illustrative aspect, a liquid crystal display is used as the display device 30.

The hard disk 40 functions as an auxiliary storage device of the control unit 10 and includes an operating system (hereinafter, referred to as OS) 41, a printer driver 42, a preview tool program 43 installed therein, and so on. In addition, in the hard disk 40, various applications (a web browser, a word processor software, software for reading PDF documents, and so on) 44 having a print function is installed.

A well known windows (registered trademark) series including a graphical user interface (GUI) may be used as the OS 41.

The printer driver 42 is software for controlling the printer 2 serving as the print device so as to communicate with the PC 1 and is operated on the OS 41.

Figure 2:
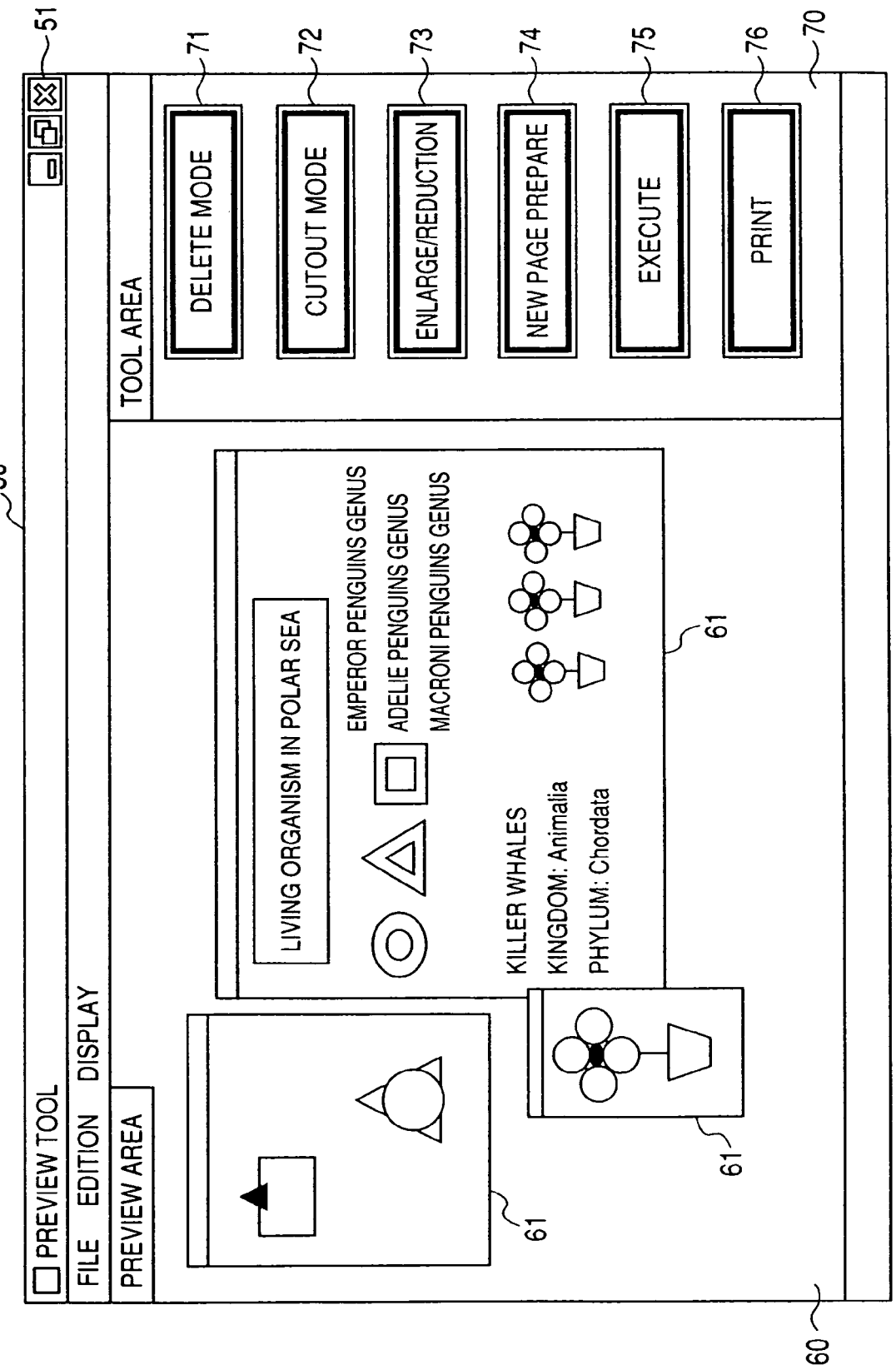
FIG. 2 is an explanatory view illustrating a print preview window.

The preview tool program 43 is software for processing a print image on a print preview screen and is operated on the OS 41 the same as the printer driver 42. Specifically, a preview window 50 shown in FIG. 2 is displayed on the display screen of display device 30 by using a function of GUT included in the OS 41.

On the preview window 50, a preview area 60 for displaying a print preview image 61 by a multi-window format is disposed on a left side, and a tool area 70 which includes operating buttons for processing the print preview image 61 displayed in the preview area 60 is disposed on a right side. Further, the position of the tool area 70 corresponding to the preview area 60 may be changed (for example, the tool area 70 may be disposed on a left side of the preview area 60).

In the tool area 70, a delete mode button 71, a cutout mode button 72, an enlargement/reduction button 73, a new page preparing button 74, an execution button 75, and a print button 76 are arranged.

Figure 3:
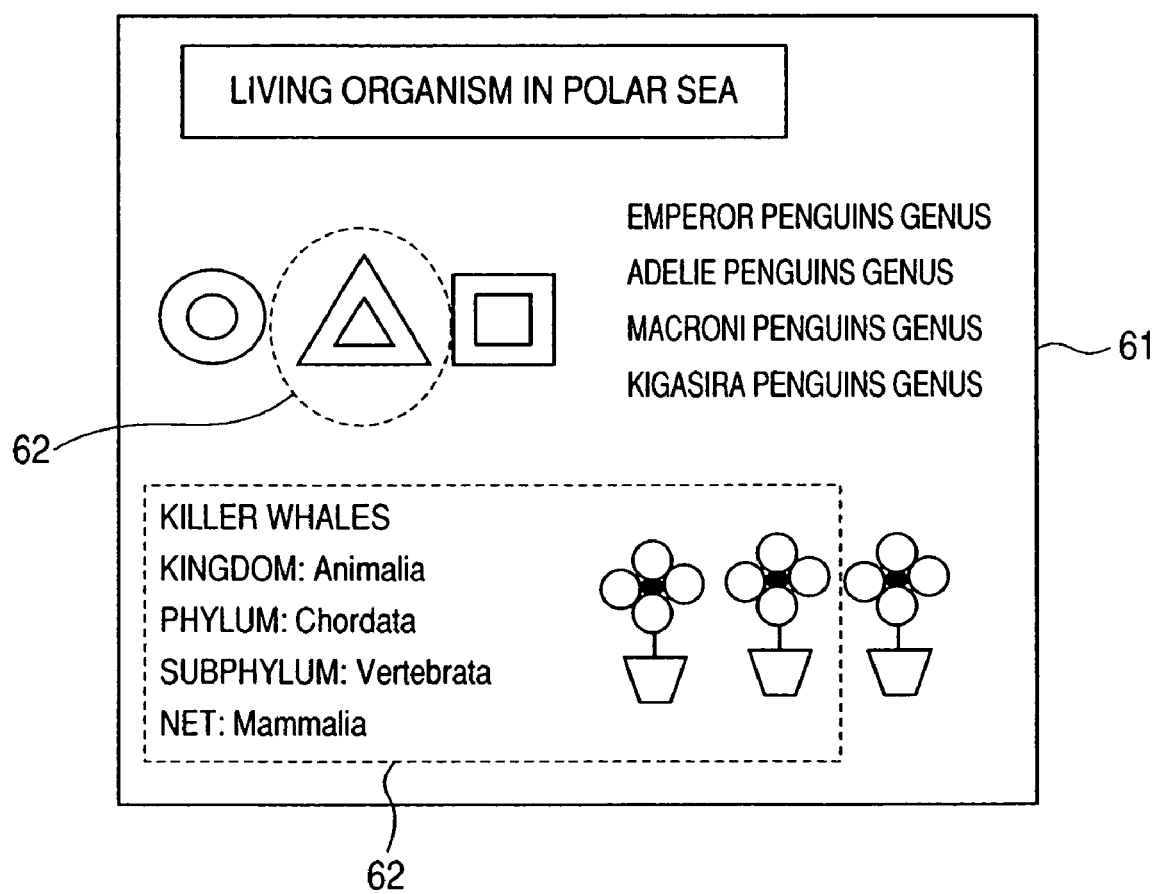
FIG. 3 is an explanatory view illustrating a region selection operation on a print preview image.

In the preview window 50, a user can select a predetermined region (a region which is selected not in a data bundle unit such as a picture or text but in a dot unit (minimum unit) of bitmap data) in the print preview image 61 displayed in the preview area 60 as shown in FIG. 3 by using a pointer in order to indicate a desired position on the display screen of the display device 30 using a pointing device (input device 20), process the print preview image 61 which uses an image in the selected region (in frame 62) in a unit, and print the processed print preview image 61 using the printer 72. Further, the preview window 50 can be moved to the desired position in the display screen of the display device 30 and the size thereof also can be adjusted.

[2. Process Performed by Control Unit]

Figure 4:
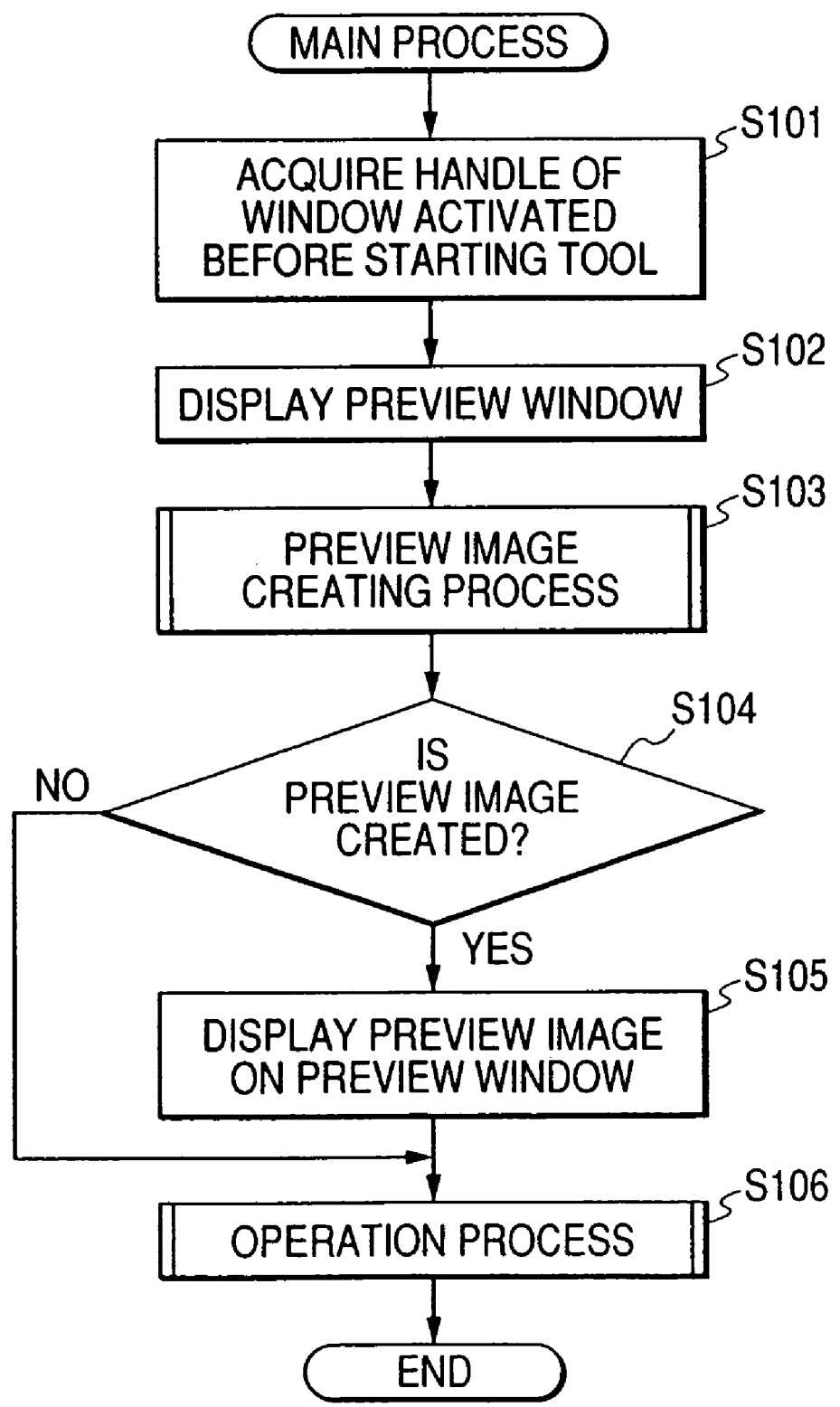
FIG. 4 is a flowchart illustrating a main process.

Next, a main process performed by the control unit 10 in accordance with the preview tool program 43 will be described with reference to a flowchart as shown in FIG. 4. The main process is started by performing an operation for starting the preview tool program 43 (for example, as the same with the conventional application, an operation of double clicking a short-cut icon displayed on the display screen of the display device 30 by using the pointing device).

In step S101, if the main process is started, first, a handle (identification information) of a window activated before the preview tool program 43 is started is acquired from the OS 41.

Subsequently, in step S102, the preview window 50 (see FIG. 2) is displayed on the display screen of the display device 30. At this moment, the print preview image 61 is displayed in the preview area 60 of the preview window 50.

Subsequently, in step S103, a preview image creating process is performed so as to create the print preview image 61 to be displayed in the preview area 60. Specifically, print data is acquired from the application 44 activated before the preview tool program 43 is started, and the print preview image 61 corresponding to the print data is created. The preview image creating process will be described later in detail (see FIG. 5).

Subsequently, in step S104, it is determined whether or not the print preview image 61 is created in the preview image creating process of step S103.

If it is determined that the print preview image 61 is created in step S104, the process proceeds to step S105 and the created print preview image 61 is displayed in the preview area 60 of the preview window 50. Thereafter, the process proceeds to step S106.

On the other hand, if it is determined that the print preview image 61 is not created in step S104, the process proceeds to step S106.

In step S10, an operation process is performed in accordance with an external operation from the input device 20. Specifically, a selection region delete process (see FIG. 6) which will be described later is performed by pushing (clicking) the delete mode button 71 in the tool area 70 of the preview window 50. In addition, a selection region cutout process (see FIG. 8) which will be described later is performed by pushing the cutout mode button 72. In addition, an enlargement/reduction process (see FIG. 10) which will be described later is performed by pushing the enlargement/reduction button 73. In addition, a new preview preparing process (see FIG. 13) which will be described later is performed by pushing the new page preparing button 74. Further, the main process is terminated by performing an operation (for example, an operation of pushing a closing button 51 disposed in upper right of the preview window 50) for terminating the preview tool program 43.

Figure 5:
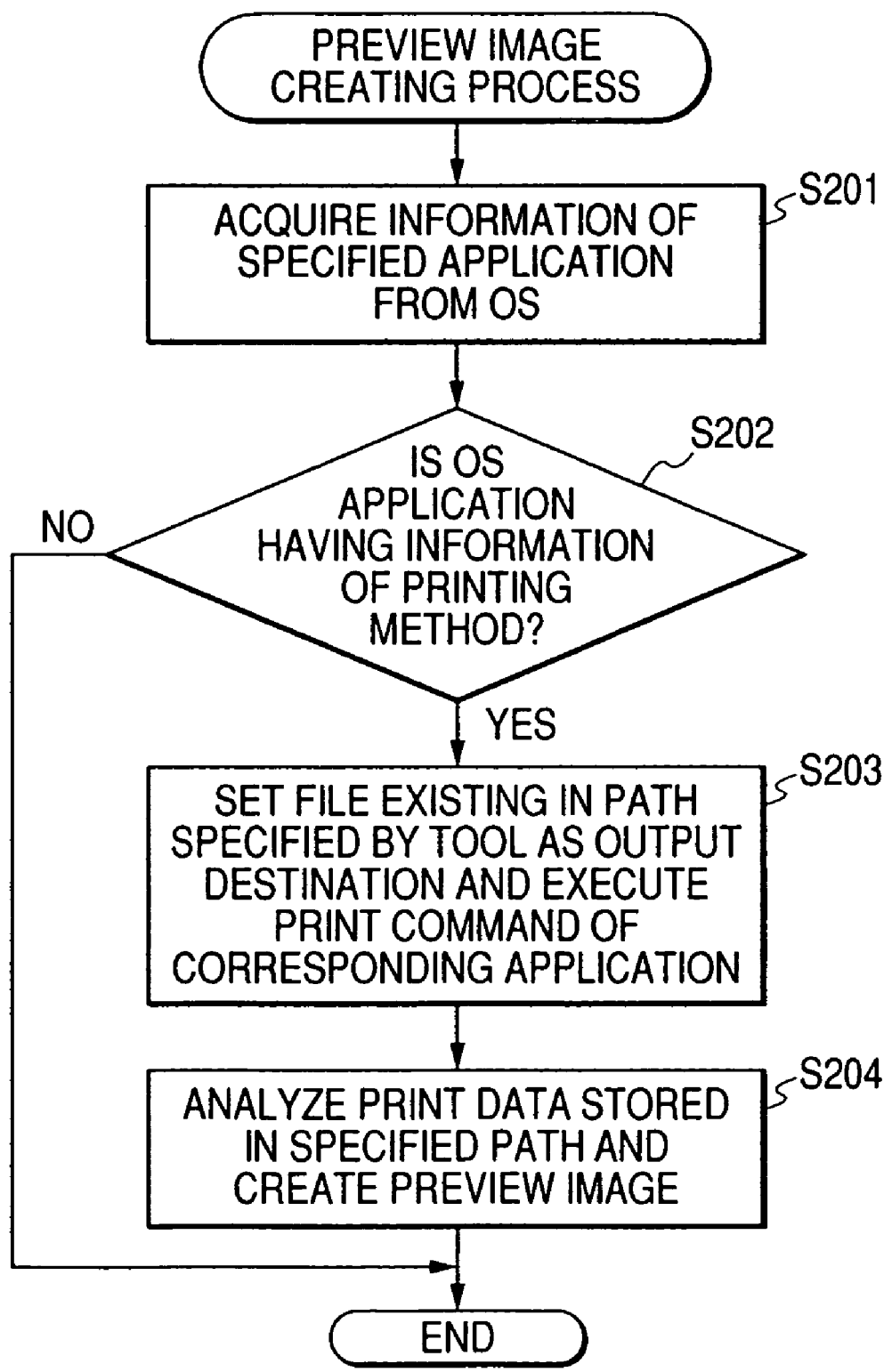
FIG. 5 is a flowchart illustrating a preview image creating process.

Next, the preview image creating process performed in step S103 of the main process (see FIG. 4) will be described with reference to a flowchart as shown in FIG. 5.

If the preview image creating process is started, in step S201, information of the application 44 activated before the preview tool program 43 is started is acquired from the OS 41 on the basis of the handle of the window acquired in step S101.

Subsequently, in step S202, it is determined whether or not the OS 41 has information of a printing method with respect to the application 44 acquired in step S201 (in other words, whether the application 44 has a print function, etc.).

Therefore, in step S202, if it is determined that the OS 41 has the information of the printing method, the process proceeds to step S203. Therefore, the application 44 sets an output destination of the print data to a file existing in a path specified by the preview tool and a print command of the application 44 is executed. Accordingly, a print process of the application 44 is performed and the print data is output and stored into the file existing in the path specified by the preview tool.

Subsequently, in step S204, the print data stored in the specified path is analyzed (expanded) and the print preview image 61 is created. Thereafter, the preview image creating process is terminated.

On the other hand, in step S202, if it is determined that the OS 41 does not have the information of the printing method, the process in step 5203 can not be performed. As a result, the preview image creating process is terminated. In this case, even though the print preview image 61 is not displayed in the preview area 60, the print data is acquired from the application 44 specified by performing an operation for acquiring predetermined print data on the preview window 50.

Figure 6:
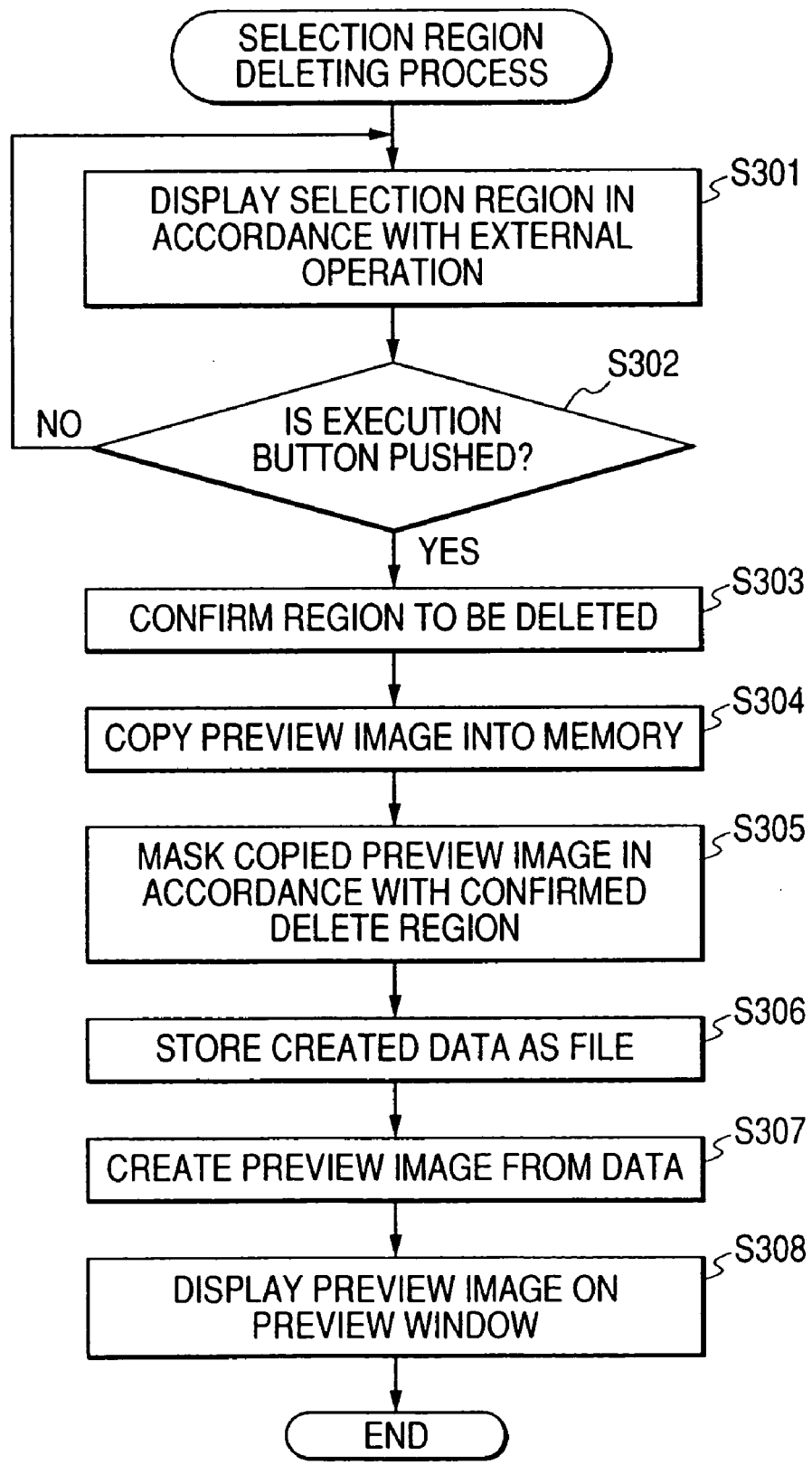
FIG. 6 is a flowchart illustrating a selection region delete process.

Next, in the operation process (step S106) of the main process (see FIG. 4), a selection region delete process executed by the control unit 10 when performing an operation of pushing the delete mode button 71 in the tool area 70 of the preview window 50 will be described with reference to a flowchart as shown in FIG. 6.

Figure 7A:
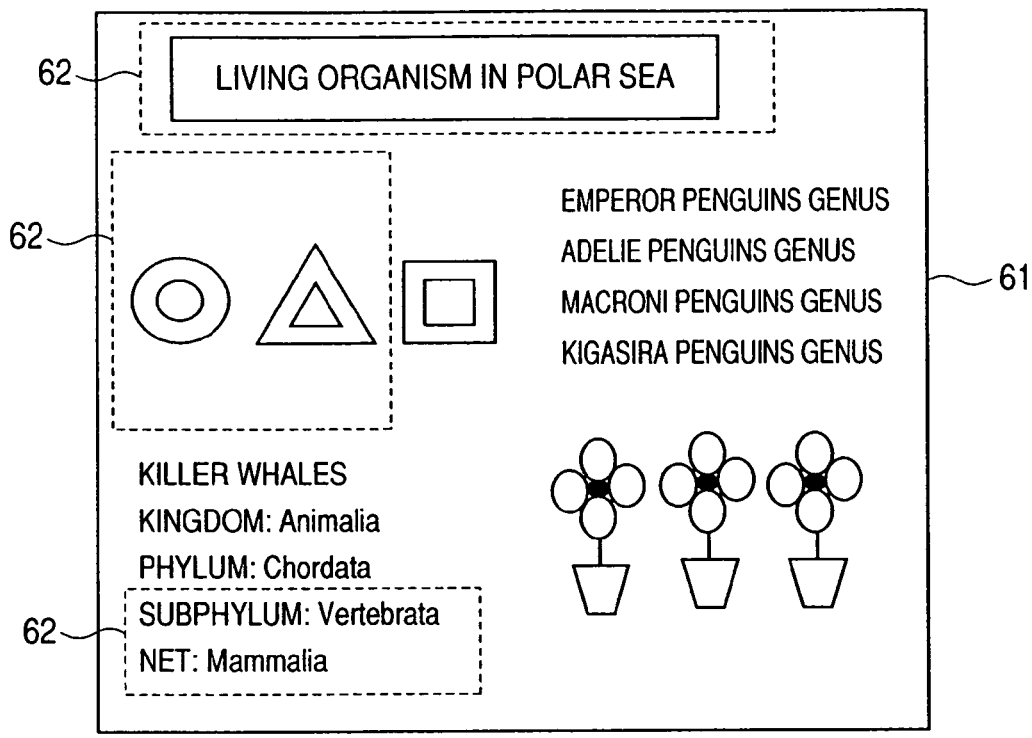
FIGS. 7A, 7B are explanatory views illustrating a selection region delete operation of the print preview image.

In step S301, if the selection region delete process is started, as shown in FIG. 7A, the frame 62 indicating an outer edge of a selected region in the preview area 60 of the preview window 50 is displayed on the basis of a command in accordance with an external operation of the user which is input by the input device 20. Specifically, a rectangular frame 62, in which a starting position and an end position of a drag operation form a diagonal line, is displayed. In addition, another figure of the frame can be used by changing the setting. For example, when the frame is set as an ellipse (see FIG. 3), an ellipse frame inscribed in the rectangle frame 62, in which the starting position and the end position of the drag operation form the diagonal line, is displayed. In addition, an operating button for changing a shape (kind of the figure) of the frame 62 may be disposed in the tool area 70.

Subsequently, in step S302, it is determined whether or not the execution button 75 is pushed in the tool area 70 of the preview window 50.

In step S302, if it is determined that the execution button 75 is not pushed, the process returns step S301. That is, the region selection can be preformed until the execution button 75 is pushed. In addition, a plurality of regions is selected by repeating the region selection operation several times (see FIG. 7A).

In step S302, when it is determined that the execution button 75 is pushed, the process proceeds to step S303, the selected region is confirmed as a region to be deleted.

In step S304, the print data of the print preview image 61 which is an object for the region selection among one or a plurality of print preview images 61 displayed on the preview window 50 is copied into memory (RAM 13).

Subsequently, in step S305, a part included in the deleted region confirmed in step S303 is masked (color of the image in the delete region becomes white) with respect to the print data of the print preview image 61 copied into the memory in step S304.

Subsequently, in step S306, the print data created in step S305 is stored in the hard disk 40 as a file.

Subsequently, in step S307, the print preview image 61 is created on the basis of the print data stored in step S305.

Figure 7B:
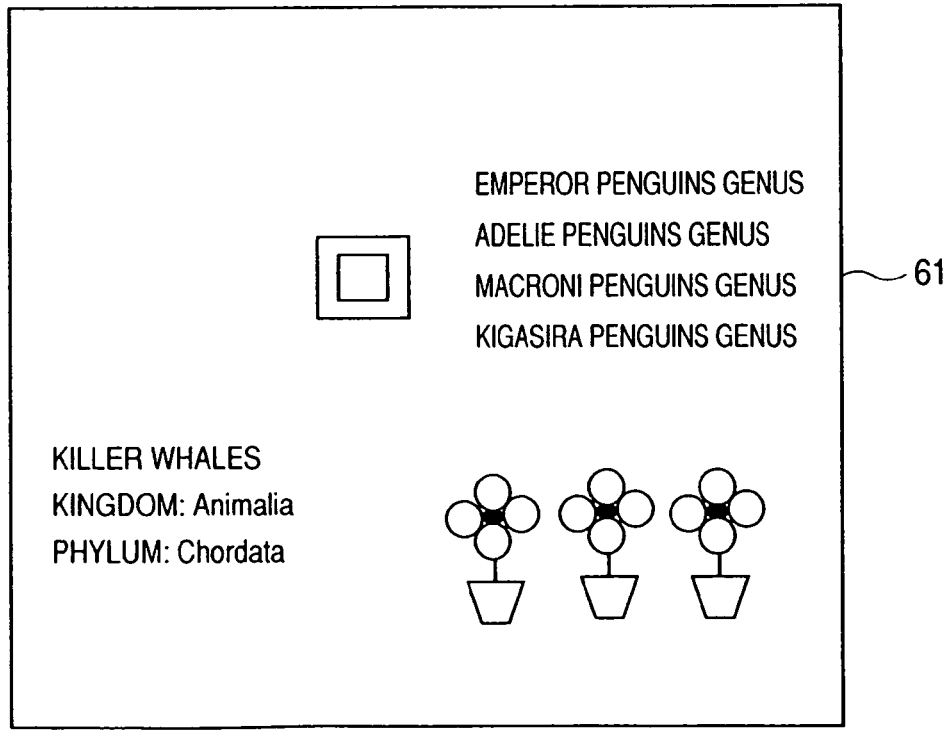

Subsequently, in step S308, as shown in FIG. 7B, the print preview image 61 created in step S307 is newly displayed in the preview area 60 of the preview window 50 in addition to the print preview image 61 (print preview image 61 which is not processed) to be processed. Accordingly, the print preview image 61 that the selected region is deleted is displayed in the preview area 60. Thereafter, the selection region delete process is terminated.

Figure 8:
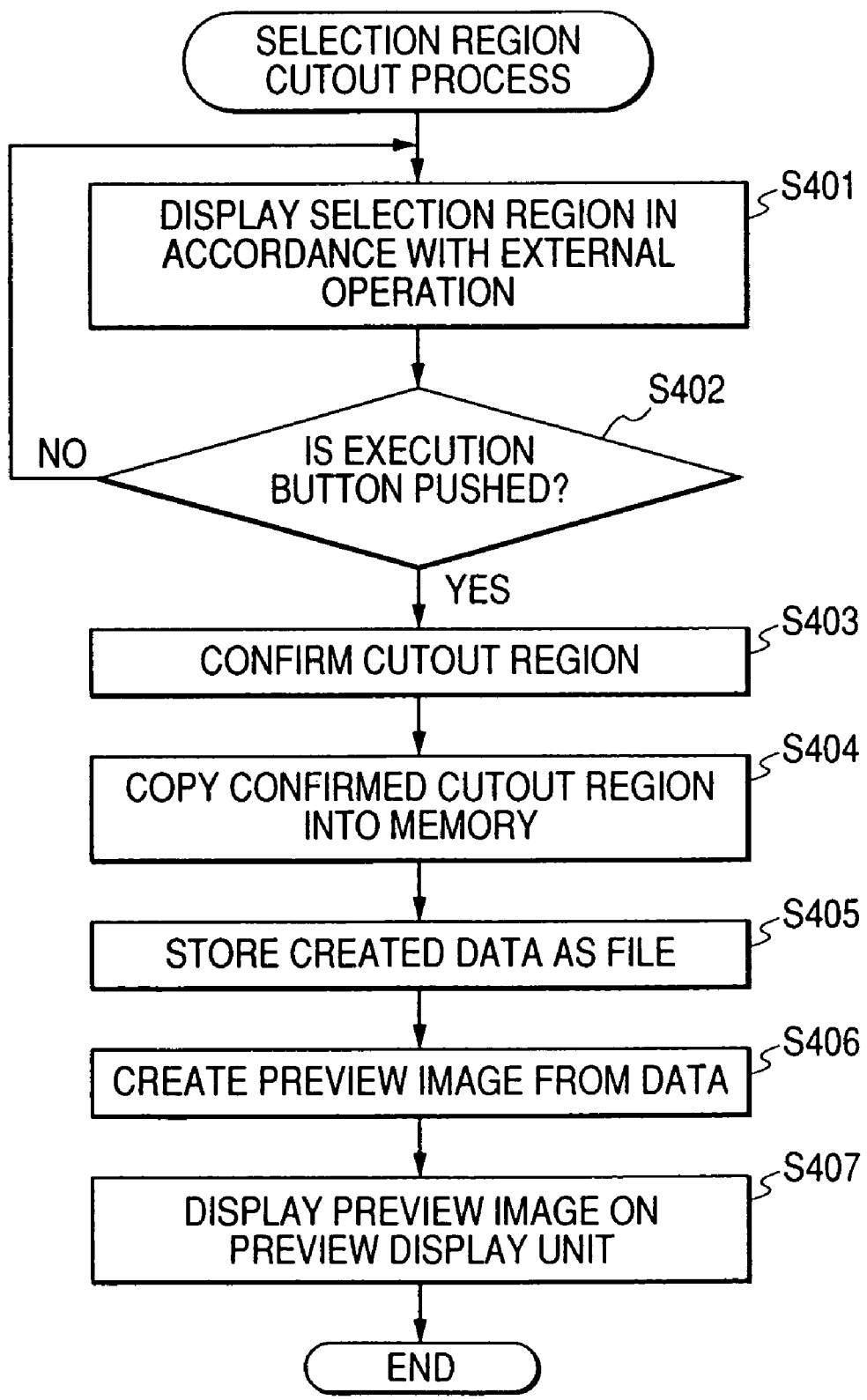
FIG. 8 is a flowchart illustrating a selection region cutout process.

Next, the selection region cutout process performed by the control unit 10 by pushing the cutout mode button 72 in the tool area 70 of the preview window 50 in the operation process (step S106) of the main process (see FIG. 4) will be described with reference to a flowchart as shown in FIG. 8.

Figure 9A:
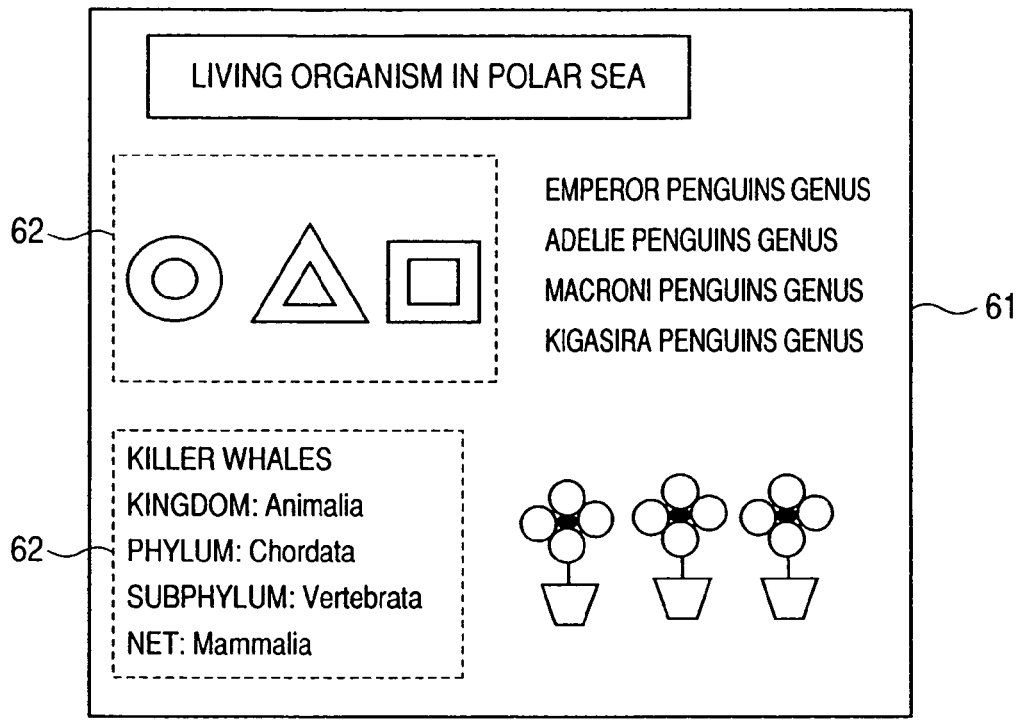
FIGS. 9A, 9B are explanatory views illustrating a selection region cutout operation of the print preview image.

If the selection region cutout process is started, in step S401, the frame 62 indicating the outer edge of the selected region in the preview area 60 of the preview window 50 as shown in FIG. 9A on the basis of the command input by the input device 20 in accordance with the external operation from the user, as the same with the above-described selection region delete process.

In step S402, it is determined whether or not the execution button 75 in the tool area 70 of the preview window 50 is pushed.

In step S402, if it is determined that the execution button 75 is not pushed, the process proceeds to step S401. That is, the region selection can be performed until the execution button 75 is pushed. In addition, a plurality of regions is selected by operating the region selection in plural times (see FIG. 9A).

On the other hand, in step S402, if it is determined that the execution button 75 is pushed, the process proceeds to step S403 and the selected region is confirmed as a cutout region.

Subsequently, in step S404, print data of the image in the cutout region confirmed in step S403 is copied into a memory (RAM 13).

Subsequently, in step S405, the print data created in step S404 is stored in the hard disk 40 as a file.

Subsequently, in step S406, the print preview image 61 is created on the basis of the print data stored in step S405.

Figure 9B:
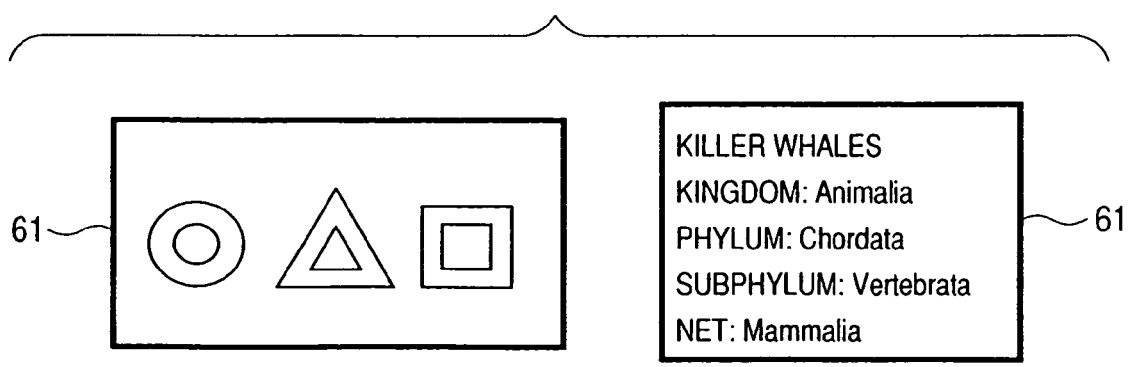

In step S407, the print preview image 61 created in step S406 is newly displayed in the preview area 60 of the preview window 50 in addition to the print preview image 61 to be processed as shown in FIG. 9B. Accordingly, the print preview image 61 in which an image except for the selected region is deleted is displayed in the preview area 60. Thereafter, the selection region cutout process is terminated.

Figure 10:
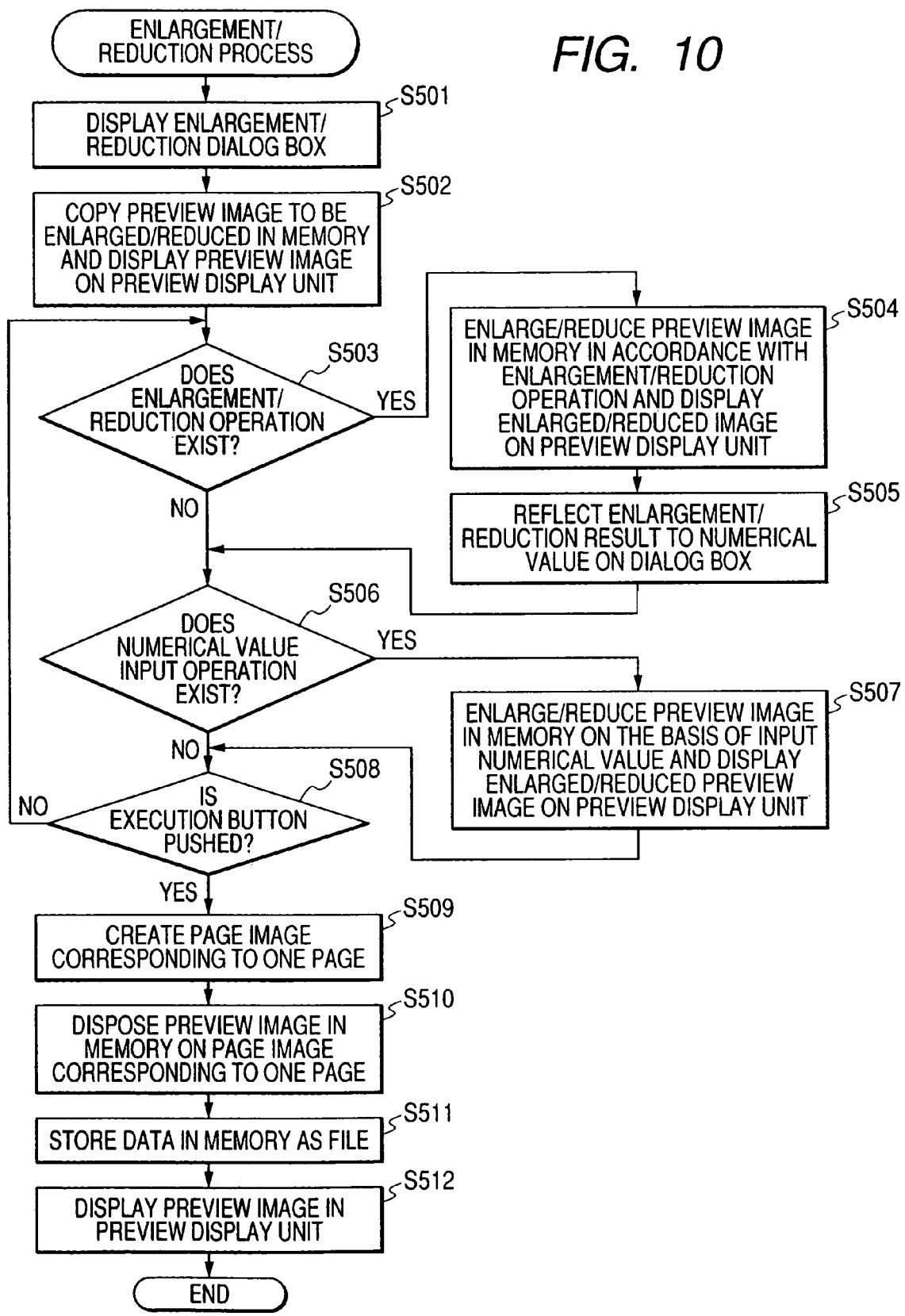
FIG. 10 is a flowchart illustrating an enlargement/reduction process.

Next, the enlargement/reduction process performed by the control unit 10 by pushing the enlargement/reduction button 73 in the tool area 70 of the preview window 50 in the operation process (step S106) of the main process (see FIG. 4) will be described with reference to a flowchart as shown in FIG. 10.

Figure 11:
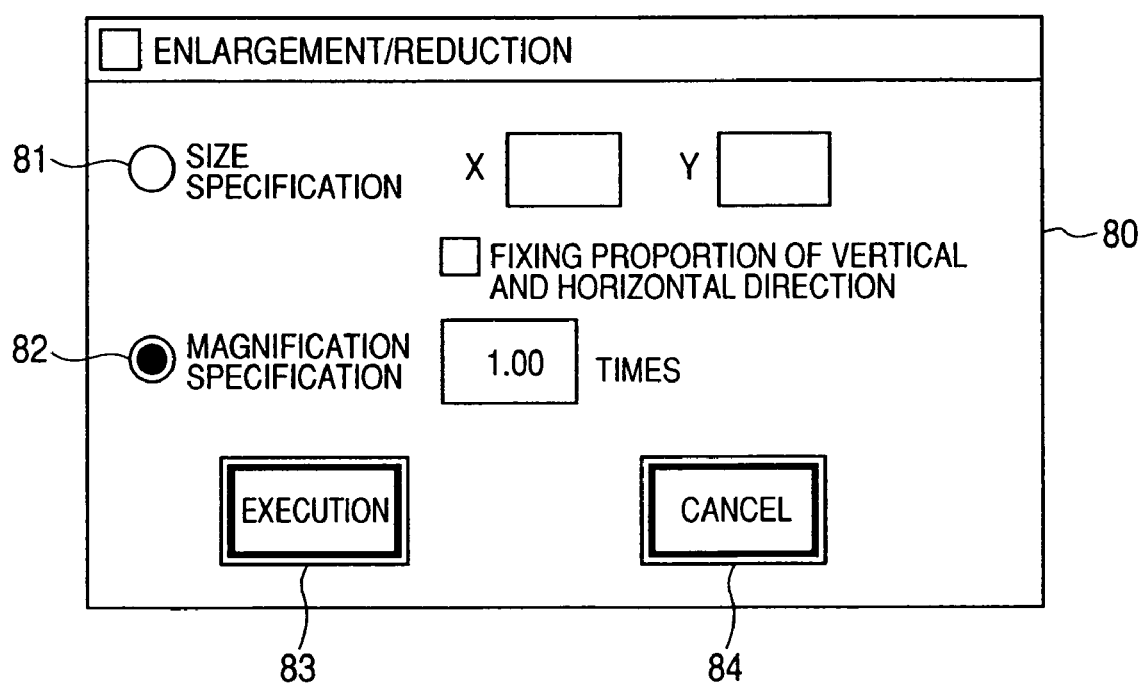
FIG. 11 is an explanatory view illustrating an enlargement/reduction dialog box.

If the enlargement/reduction process is started, in step S501, an enlargement/reduction dialog box 80 as shown in FIG. 11 is displayed on the display screen of the display device 30. The enlargement/reduction dialog box 80 specifies magnification for enlarging or reducing a size of an image corresponding to a print page reduction by inputting numerical value. Specifically, one of two specifying methods of 'size specification' which inputs a horizontal (X direction) length and a vertical (Y direction) length and 'magnification specification' which inputs the magnification can be selected by radio buttons 81 and 82. In addition, the enlargement/reduction dialog box 80 includes an execution button 83 for executing enlargement/reduction based on the input numerical value and a cancel button 84 for canceling an operation by the enlargement/reduction dialog box 80.

Figure 12A:
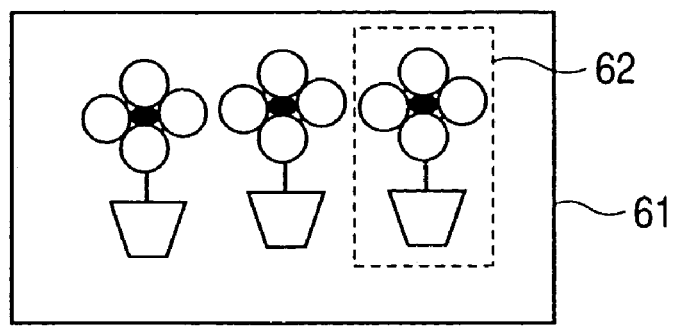
FIGS. 12A, 12B, and 12C are explanatory views illustrating an enlargement/reduction operation of the print preview image.
Figure 12B:
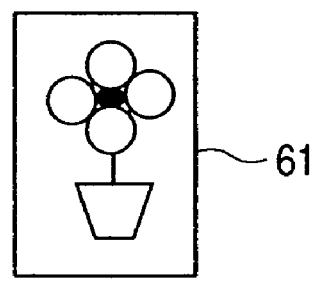
Figure 12C:
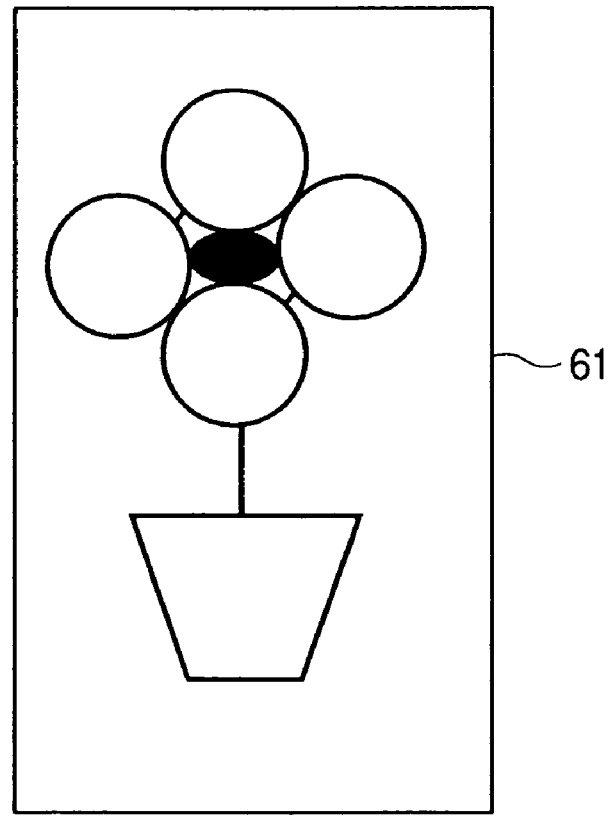

Subsequently, in step S502, print data of the print preview image 61 to be enlarged/reduced is copied to a memory and the preview image 61 corresponding to the print data is displayed on the preview area 60 of the preview window 50. Here, the print preview image 61 to be enlarged/reduced is the image cutout by the above-described selection region cutout process. That is, a predetermined region of the print preview image 61 is selected as shown in FIG. 12A, and the cutout image becomes an object to be enlarged or reduced as shown in FIG. 12B.

Subsequently, in step S103, it is determined whether or not an enlargement/reduction operation of the print preview image 61 is performed on the basis of a command in accordance with an external operation by the user which is input by the input device 20. Specifically, a drag operation when a pointer is located at an end of the print preview image 61 is determined as the enlargement/reduction operation.

In step S503, it is determined that the enlargement/reduction operation of the print preview image 61 is performed, the process proceeds to step S504 and the print preview image 61 is enlarged/reduced in accordance with an enlargement/reduction operation with respect to the print data in the memory. The print preview image 61 indicated by print data after the enlargement/reduction process is newly displayed on the preview area 60 of the preview window 50 in addition to the print preview image 61 (before the enlargement/reduction operation is performed) to be enlarged/reduced, the print preview image 61 (for example, changing only a size of the print preview image 61) may be updated without displaying a new print preview image 61.

Subsequently, in step S505, an enlargement/reduction result is reflected to the numeric value on the enlargement/reduction dialog box 80 and then the process proceeds to step S506.

On the other hand, in step S503, if it is determined that the enlargement/reduction operation of the print preview image 61 is not performed, the process proceeds to step S506.

In step S506, it is determined whether or not the numeric value input operation (pushing the execution button 83 on the enlargement/reduction dialog box 80 after inputting desired numeric value) is performed on the enlargement/reduction dialog box 80.

In step S506, if it is determined that the numeric value input operation is performed, the process proceeds to step S507, the print preview image 61 is enlarged/reduced on the basis of the input numeric value with respect to the print data in the memory, and the print preview image 61 indicated by the print data after the enlargement/reduction process is displayed on the preview area 60 of the preview window 50. Thereafter, the process proceeds to step S508.

On the other hand, in step S506, if it is determined that the numeric value input operation is not performed, the process proceeds to step S508.

Subsequently, in step S508, it is determined whether or not the execution button 75 in the tool area 70 of the preview window 50 is pushed.

Accordingly, in step S508, if it is determined that the execution button 75 is not pushed, the process returns step S503. That is, the enlargement/reduction operation can be performed until the execution button 75 is pushed.

On the other hand, in step S508, it is determined that the execution button 75 is pushed, the process proceeds to step S509 and page data indicating a page image corresponding to one page is created.

Subsequently, in step S510, the print data in which the print preview image 61 corresponding to the print data in the memory is disposed on the page image indicating the page data created in step S509 is created.

Subsequently, in step S511, the print data created in step S510 is stored in a file.

Subsequently, in step S512, the print preview image 61 indicated by the print data created in step S510 is displayed on the preview area 60 of the preview window 50. Thereafter, the enlargement/reduction process is terminated.

Figure 13:
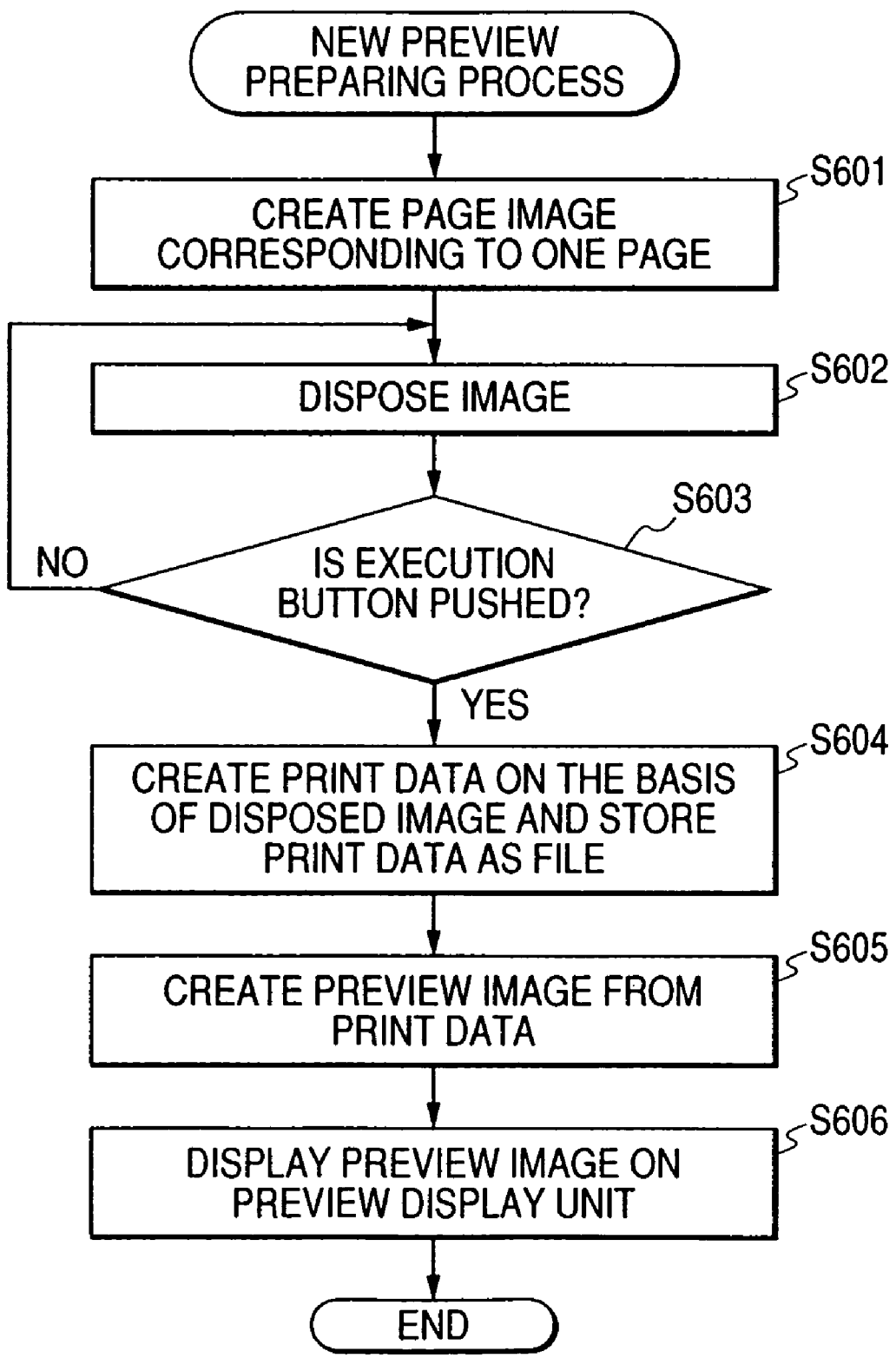
FIG. 13 is a flowchart illustrating a new print preview preparing process.

Next, a new preview preparing process performed by the control unit 10 by pushing the new page preparing button 74 in the tool area 70 of the preview window 50 by the operation process (step S106) of the main process (see FIG. 4) will be described with reference to a flowchart as shown in FIG. 13.

If the new preview preparing process is started, first, in step S601, a page image corresponding to one page in which no image exist is displayed on the preview area 60 of the preview window 50.

Figure 14A:
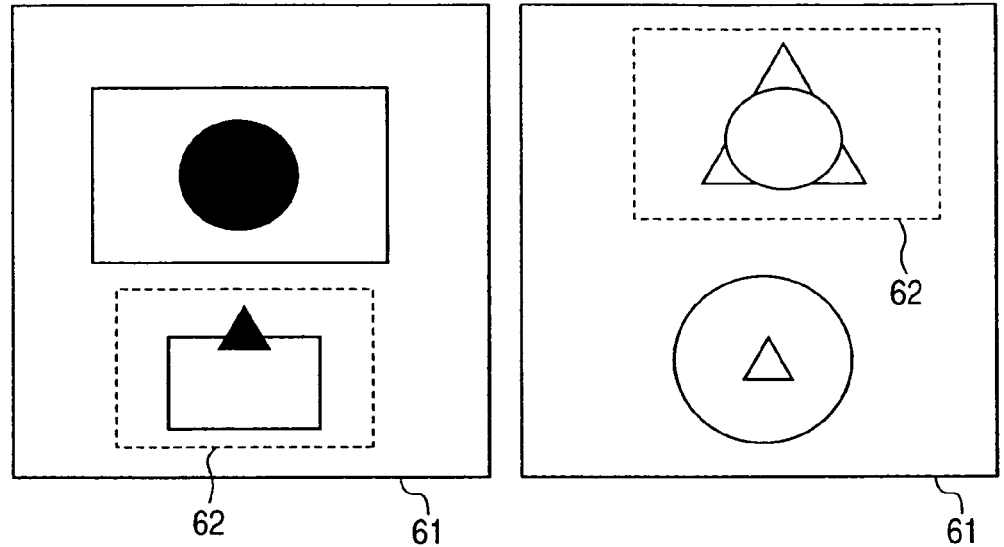
FIGS. 14A, 14B, 14C are explanatory views illustrating a combining operation of the new print preview image.
Figure 14B:
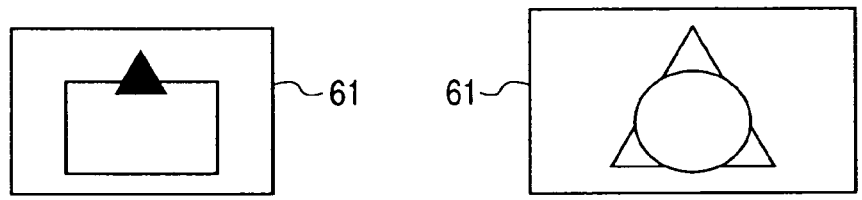
Figure 14C:
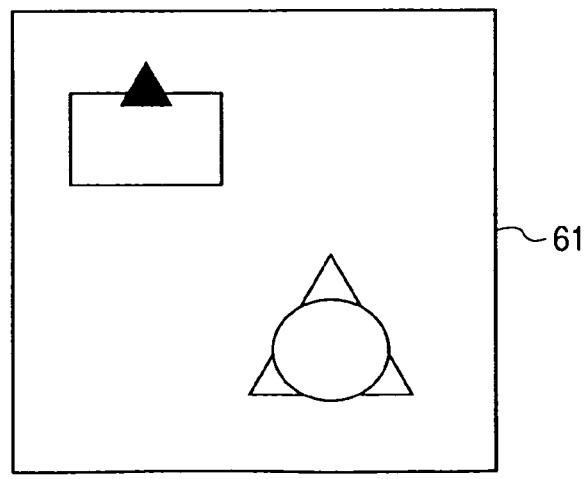

In step S602, a desired print preview image 61 existing on the preview window 50 is disposed on the page image based on a command in accordance with an external operation by the user which is input by the input device 20. Specifically, according to the selection region cutout process, predetermined regions of each of different print preview images 61 are selected as shown in FIG. 14A, the cutout the preview images 61 as shown in FIG. 14B can be disposed on the same page image as shown in FIG. 14C by a drag and drop operation of a pointing device.

Subsequently, in step S603, it is determined whether or not the execution button 75 in the tool area 70 of the preview window 50 is pushed.

Accordingly, in step S603, if is determined that the execution button 75 is not pushed, the process returns step S602. That is, the image can be disposed until the execution button 75 is pushed.

On the other hand, in step S603, if is determined that the execution button 75 is pushed, the process proceeds to step S604, print data is created on the basis of the disposed image, and the created print data is stored in the hard disk 40 as a file.

Subsequently, in step S605, the print preview image 61 is created on the basis of the print data created in step S604.

Subsequently, in step S606, the print preview image 61 created in step S605 is displayed in the preview area 60 of the preview window 50. As a result, the print preview image 61 including images corresponding to different pages is displayed in the preview area 60. Thereafter, the new preview preparing process is terminated.

Figure 15:
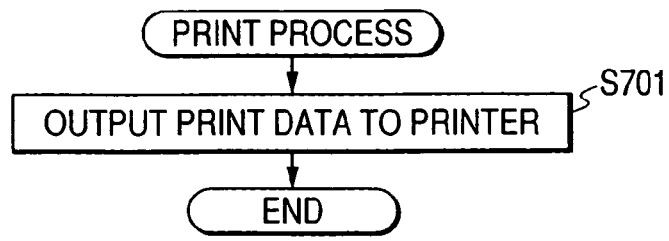
FIG. 15 is a flowchart illustrating a print process.

Next, a print process performed by the control unit 10 by pushing the print button 76 in the tool area 70 of the preview window 50 in the operation process (step S106) of the main process (see FIG. 4) will be described with reference to a flowchart as shown in FIG. 15.

If the print process is started, print data (data stored as a file after the image processing) of the activated print preview image 61 on the preview area 60 of the preview window 50 is output to the printer 2 in step S701. As a result, the print preview image 61 is printed by the printer 2. Thereafter, the print process is terminated.

As described above, according to the PC 1 of the illustrative aspect, the user can select a predetermined region of the print preview image 61, process the print preview image 61 through a simple operation such as deleting or extracting the selection region, and create the new print preview image 61 in which unnecessary parts for the print are deleted.

Specifically, since it is possible to easily delete unnecessary parts for the print from the print preview image 61 by selecting the predetermined region after pushing the delete mode button 71, it is possible to improve operability in an image processing in the case that there are few unnecessary parts in the print preview image 61.

In addition, since it is possible to easily extract a desired print part of the print preview image 61 by selecting the predetermined region after pushing the cutout mode button 72, it is possible to improve operability in an image processing in the case that there are few parts to be printed in the print preview image 61.

In addition, as a result of extracting the desired print part from the print preview image 61, it is also possible to change the extracted image to a desired size and print the image having the changed size by the enlargement/reduction operation after pushing the enlargement/reduction button 73 even when the extracted image occupies small proportion in the print page. Therefore, for example, it becomes easier to see when only the desired part of the image is enlarged and printed, or to be portable when the desired image is reduced and printed.

On the other hand, since by the image disposing operation after pushing the new page preparing button 74, it is possible to collect the images existing different pages in the same page so as to print it, it is possible to reduce unnecessary consumption of a recording medium such as papers in the printer 2. In addition, it is also possible to dispose the image in accordance with a preference of a user so as to print it.

According to the PC 1 of the illustrative aspect, since the print preview image 61 can be processed by using an extremely simple operation and the processed print preview image 61 can be printed in the printer 2, it is possible to prevent useless consumption of color materials such as toner and ink in the printer 2. In particular, since the print preview image 61 can be processed in a unit of an image in a desired selection region of the print preview image 61, it is possible to freely cut out a part to be printed or an unnecessary part for the print, for example, only predetermined part of a picture or a drawing can be printed. Moreover, since it is unnecessary to edit original data, it is useful to applications, such as a web browser and software for reading FDF documents, which can not edit the original data. In addition, since it is possible to process an image without editing the original data during the print in an application, such as a word processor, which is capable of editing the original data, it is also possible to freely process an image by considering only an immediate condition during the print.

In addition, in the PC 1 according to the illustrative aspect, since the processed print preview image 61 is newly and differently displayed from the print preview image 61 which is not processed by processing the print preview image 61, it is possible to create print preview images 61 having a plurality of patterns of contents different each other on the basis of one print preview image 61.

In the PC 1 according to the illustrative aspect, the display device 30 serves as the display unit and the input device 20 serves as the input unit. Step S203 of the preview image creating process (see FIG. 5) serves as the image data acquiring unit, step S105 of the main process (see FIG. 4) serves as the preview display processing unit, and step S301 of the selection region delete process (see FIG. 6) and step S401 of the selection region cutout process (see FIG. 8) serve as the selection region display processing unit. Steps S303 to S308 of the selection region delete process (see FIG. 6), steps S403 to S407 of the selection region cutout process (see FIG. 8), the enlargement/reduction process (see FIG. 10), and steps S604 to S606 of the new preview preparing process (see FIG. 13) serve as the image data processing unit, and the print process (see FIG. 15) corresponds to the print instructing unit.

Hereinbefore, an illustrative aspect has been described but the invention may have various other aspects.

For example, in the PC 1 according to the above-illustrative aspect, when the print preview image 61 is processed, the processed print preview image 61 is newly displayed while the print preview image 61 not processed still remains. However, the illustrative aspect is not limited to this and may display only the processed print preview image 61.

In addition, in the PC 1 according to the above-illustrative aspect, the processing method for an image is selected by using the operating buttons disposed in the tool area 70. However, the illustrative aspect is not limited to this and, for example, an item having the same function as the operating button may be displayed to be selected by a predetermined operation (for example, pushing a right button on a pointing device) while a pointer is positioned on the print preview image 61.

In addition, in the PC 1 according to the illustrative aspect, the selection region is selected after pushing the delete mode button 71 or the cutout mode button 72. However, on the contrary, the selection region may be selected and then instructed to be deleted or cut out.

According to the illustrative aspects, a user can select a predetermined region of a print preview image displayed on a display unit in accordance with an external operation by using an input unit so that the user can process the print preview image in a unit of an image in the selected region. Accordingly, it is possible to perform a process of excluding an unnecessary part of an image to be printed by a simple operation on the print preview image. As a result, it is possible to prevent useless consumption of color materials such as toner and ink in the print device. In particular, since the print preview image can be processed in a unit of an image in a selected region of the print preview image, it is possible to freely cut out a part to be printed or an unnecessary part for the print, for example, it is possible to print only predetermined part of a picture or a drawing. Moreover, since it is unnecessary to edit original data, it is useful for applications, such as a web browser and software for reading PDF documents, which are not capable of editing the original data. In addition, since it is possible to process an image without editing the original data during the print in an application, such as a word processor, which is capable of editing the original data, it is also possible to freely process an image by considering only an immediate condition during the print.

Specifically, for example, in the information processing apparatus according to the illustrative aspect, the image data processing unit performs an image delete process, as the image processing process, for creating a print preview image in which an image in the selected region displayed on the display unit by the selection region display processing unit is deleted. According to the above-configured information processing apparatus, it is possible to easily delete an unnecessary part for the print in the print preview image. In particular, it is possible to improve an image processing operability in the case that there are few unnecessary parts in the print preview image.

In addition, in the information processing apparatus according to according to the illustrative aspect, the image data processing unit of the image data processing unit performs an image cutout process, as the image processing process, for creating a print preview image in which an image except for the image in a selection region displayed on the display unit by the selection region display processing unit is deleted. According to this configured information processing apparatus, since it is possible to easily extract a desired print part of the print preview image. As a result, it is possible to improve an image processing operability in the case that there are few parts to be printed in the print preview image.

In addition, in the information processing apparatus according to the illustrative aspect, the image data processing unit of the information processing apparatus performs a process, as the image processing process, for changing the printing size of the print preview image created by the image cutout process. Accordingly, as a result of extracting a desired part to be printed from the print preview image, it is possible to change the extracted image to a desired size and print the image having the changed size even when the extracted image occupies small proportions in the print page. Therefore, for example, it is also possible to only print a necessary part of the image.

In addition, in the information processing apparatus according to the illustrative aspect, the image data processing unit according to the information processing apparatus performs an image composing process, as the image processing process, for creating a print preview image composing a plurality of images within the selected region displayed on the display unit by the selection region display processing unit. According to this configured information processing apparatus, it is possible to print images existing different pages by collecting in the same page. As a result, it is possible to reduce unnecessary consumption of a recording medium such as a paper in the print device.

Next, a storage medium readable by computer, which includes a display unit for displaying an image and an input unit for inputting a command in accordance with an external operation, to execute a function as the image data acquiring unit, the preview display processing unit, the selection region display processing unit, the image data processing unit, and the print instructing unit of the information processing apparatus. According to the storage medium readable by computer, it is possible to construct the information processing apparatus by using a general personal computer and acquire above-described effects. The storage medium may be stored in a computer readable storage medium such as a magneto-optical disk, a memory made of a semiconductor, or a magnetic disk, for example, a flexible disk.

Figure 16A:
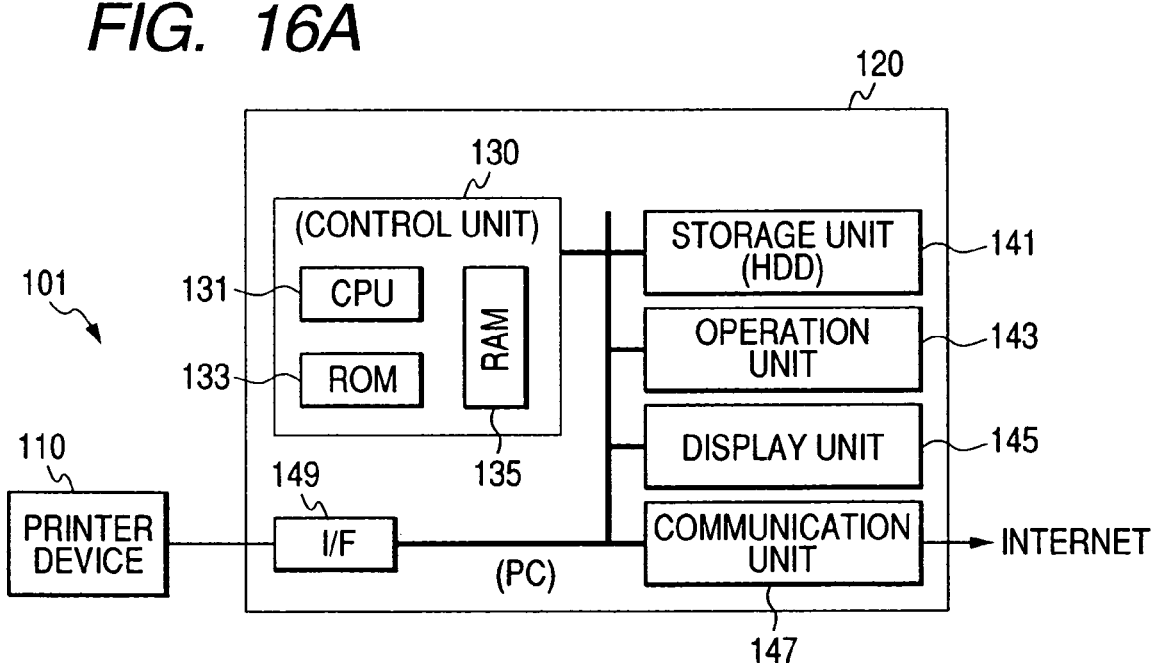
FIG. 16A is an explanatory view illustrating a configuration of a print system 101 according to another illustrative aspect.

FIG. 16A is an explanatory view illustrating a configuration of a print system 101 according to another illustrative aspect.

As shown in FIG. 16A, the print system 101 includes a printer device 110 and a personal computer (PC) 120. In the illustrative aspect, as the printer device 110, for example, an inkjet printer, a laser printer, or a digital complex machine having a printer function, can be adopted.

The PC 120 includes a control unit 130 having a CPU 131, a ROM 133, a RAM 135, and the like, a storage unit 141 having a hard disk and the like, an operation unit 143 having a pointing device or a keyboard so as to be operated by a user, a display unit 145 which has a liquid crystal display and the like so as to display various information, a communication unit 147 connected to the Internet so as to perform an interactive communication with a device on the Internet, and an interface (I/F) 149 connected to the printer device 110

Figure 16B:
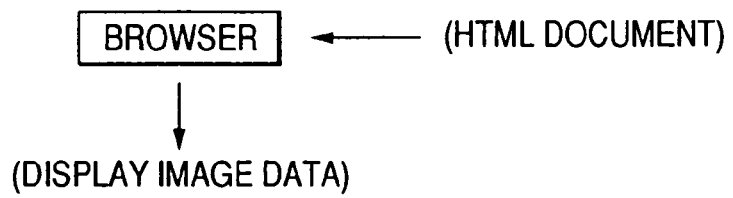
FIG. 16B is an explanatory view illustrating a configuration of the print system 101 according to another illustrative aspect.

The storage unit 141 stores an operating system (OS) which generally controls the PC and a browser which generates a display image data by analyzing an HTML document acquired from a server device on the Internet and displays an image on the display unit 145 on the basis of the display image data. FIG. 16B is a view simply illustrating a function realized by the CPU 131 in accordance with driving the browser.

In addition, the storage unit 141 stores a print processing program for causing the printer device 110 to print a document specified by an external command. The print processing program includes a program (print processing program for an HTML document) for causing the CPU 131 to execute a function as an image processing apparatus. If the user inputs a print instruction specifying an HTML document as a document to be printed through the operation unit 143, the CPU 131 executes an HTML document print process so as to convert the HTML document to be printed into a print image data (two-dimensional bitmap data which includes a row (horizontal) and a column (vertical)) and to make the printer device 110 print an image on the basis of the print image data.

Figure 17:
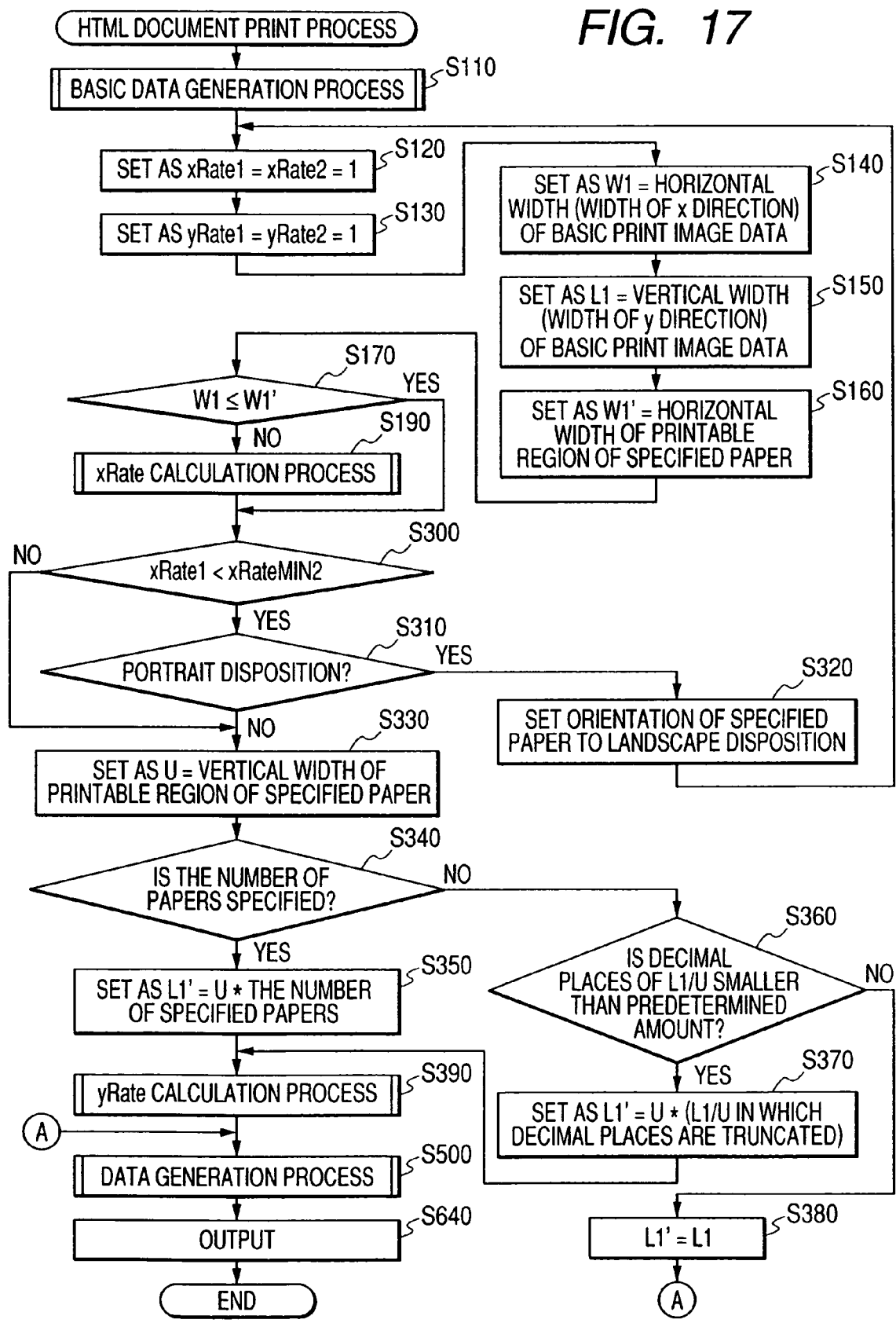
FIG. 17 is a flowchart illustrating an HTML document print process executed by a CPU 131.
Figure 18:
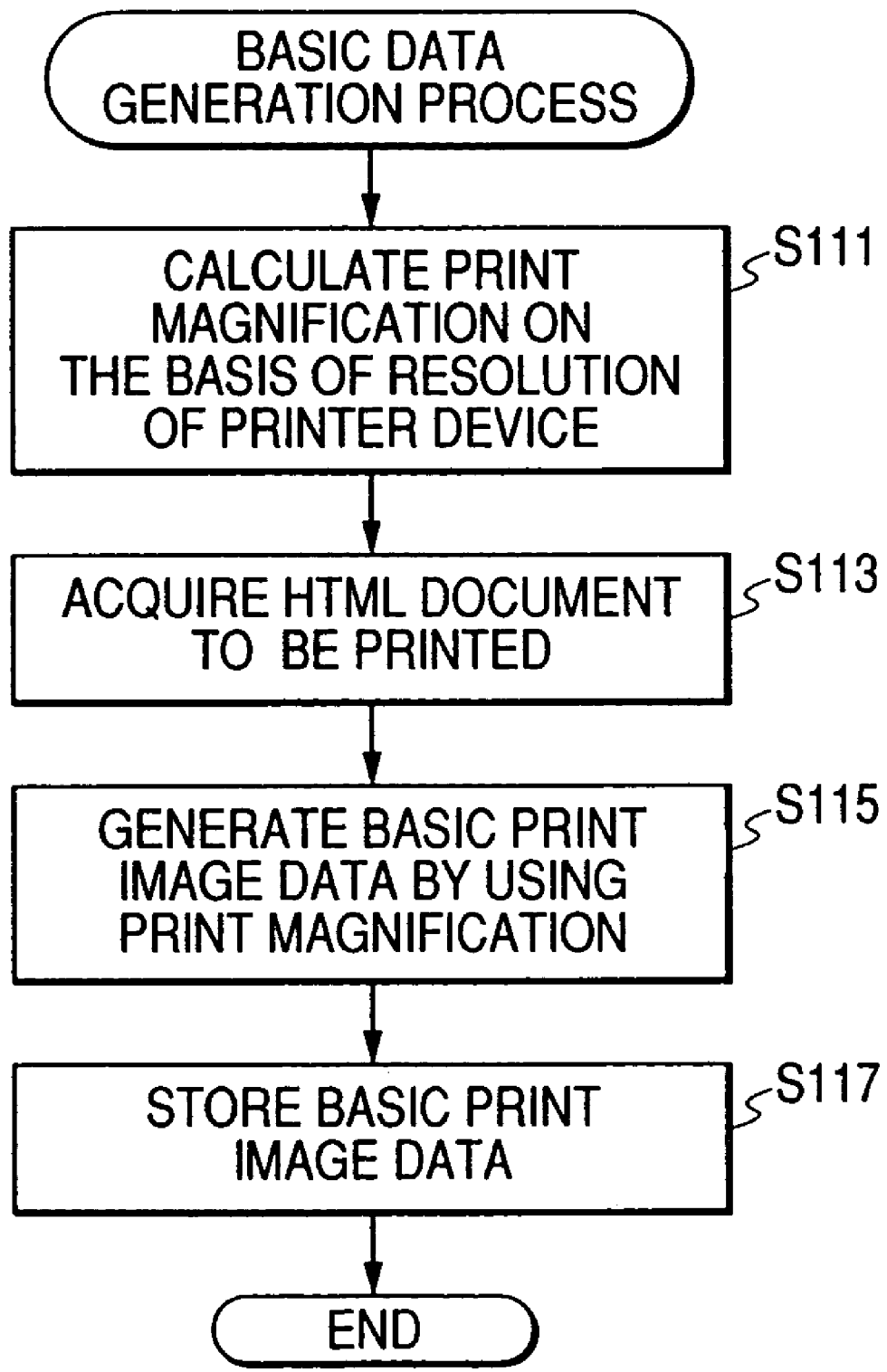
FIG. 18 is a flowchart illustrating a basic data generation process executed by the CPU 131.

FIG. 17 is a flowchart illustrating the HTML document print process executed by the CPU 131. If the HTML document print process is executed, the CPU 131 executes a basic data generation process in step S110. FIG. 18 is a flowchart illustrating the basic data generation process executed by the CPU 131.

If the basic data generation process is executed, the CPU 131, first, calculates a magnification for the print on the basis of a print resolution of the printer device 110 (S111). In the illustrative aspect, the program, included in the browser, for generating display image data (two-dimensional bitmap data which includes a row (horizontal) and a column (vertical)) from the HTML document is used to generate the print image data from the HTML document. The display image data is generated in accordance with a predetermined standard display resolution (corresponding to 128 dpi). Accordingly, in order to generate the print image data from the display image data while corresponding a character size displayed on the display to a printed character size, an enlargement (or reduction) process should be executed when generating the print image data from the display image data. Here, a magnification used during the enlargement (or reduction) process is acquired as a print magnification. In particular, the print magnification is calculated as the following equation.

print magnification=print resolution of the print device/128

For example, if the print resolution of the printer device 110 is 600 dpi, the print magnification is set to 4.6875 in step S111.

If the process in step S111 is terminated, the CPU 131 acquires the HTML document to be printed from a storage source (storage unit 141) (S113), converts the HTML document into the display image data by using a function of the browser, executes the enlargement (or reduction) process with respect to the display image data by using the print magnification set in step S111, and generates the print image data (hereinafter, the print image data is particularly called as 'basic print image data') (S115). And then, the CPU 131 temporally stores the basic print image data in an operation region (S117) and terminates the corresponding basic data generation process.

If the basic data generation process is terminated in step S110, the CPU 131 proceeds to step S120 and sets parameters xRate1 and xRate2 to 1, respectively. The parameter xRate1 is a parameter which indicates a reduction rate of an x direction (x direction corresponds to a row (horizontal) direction in the case that the image data is captured in a two-dimensional space) of a region (non-important region) excluding an important region, which will be described later, of the basic print image data. The parameter xRate2 is a parameter which indicates a reduction rate of an x direction of the important region of the basic print image data.

If the process in step S120 is terminated, the CPU 131 proceeds to step S130 and sets parameters yRate1 and yRate2 to 1, respectively. The parameter yRate1 is a parameter which indicates a reduction (or enlargement) rate of a y direction (y direction corresponds to a column (vertical) direction in the case that the image data is captured in a two-dimensional space) of a non-important region of the basic print image data. The parameter yRate2 is a parameter which indicates a reduction (or enlargement) rate of a y direction of the important region of the basic print image data.

If the process in step S130 is terminated, the CPU 131 sets a horizontal width (the number of pixels in the horizontal direction) of the generated basic print image data to a parameter W1 (S140) and sets a vertical width (the number of pixels in the vertical direction) of the basic print image data to a parameter L1 in step S150. In addition, if the process in step S150 is terminated, the CPU 131 sets a horizontal width of a printable region of a specified paper to a parameter W1' (S160).

In the PC 120, it is assumed that the printer device 110 is configured to be capable of forming an image on a paper of a plurality of sizes. Accordingly, when the print is instructed, information on a paper (specified paper) specified by the user is input to a print processing task for the HTML document. The relationship between the paper and the horizontal region or the vertical region of the printable region is prescribed for every paper size and stored in the storage unit 141.

If the process in step 3160 is terminated, the CPU 131 proceeds to step S170 and determines whether or not a value of the parameter W1 indicating the horizontal width of the basic print image data is less than or equal to a value of the parameter W1' indicating the horizontal width of the printable region of the specified paper used when the printer device 110 performs the print. If it is determined that the value of the parameter W1 is not less than or equal to the value of the parameter W1' (No in step (S170), the CPU 131 executes an xRate calculation process (S190). On the other hand, if it is determined that the value of the parameter W1 is less than or equal to the value of the parameter W1' (Yes in step S170), the CPU 131 proceeds to step S300 without executing the xRate calculation process.

Figure 19:
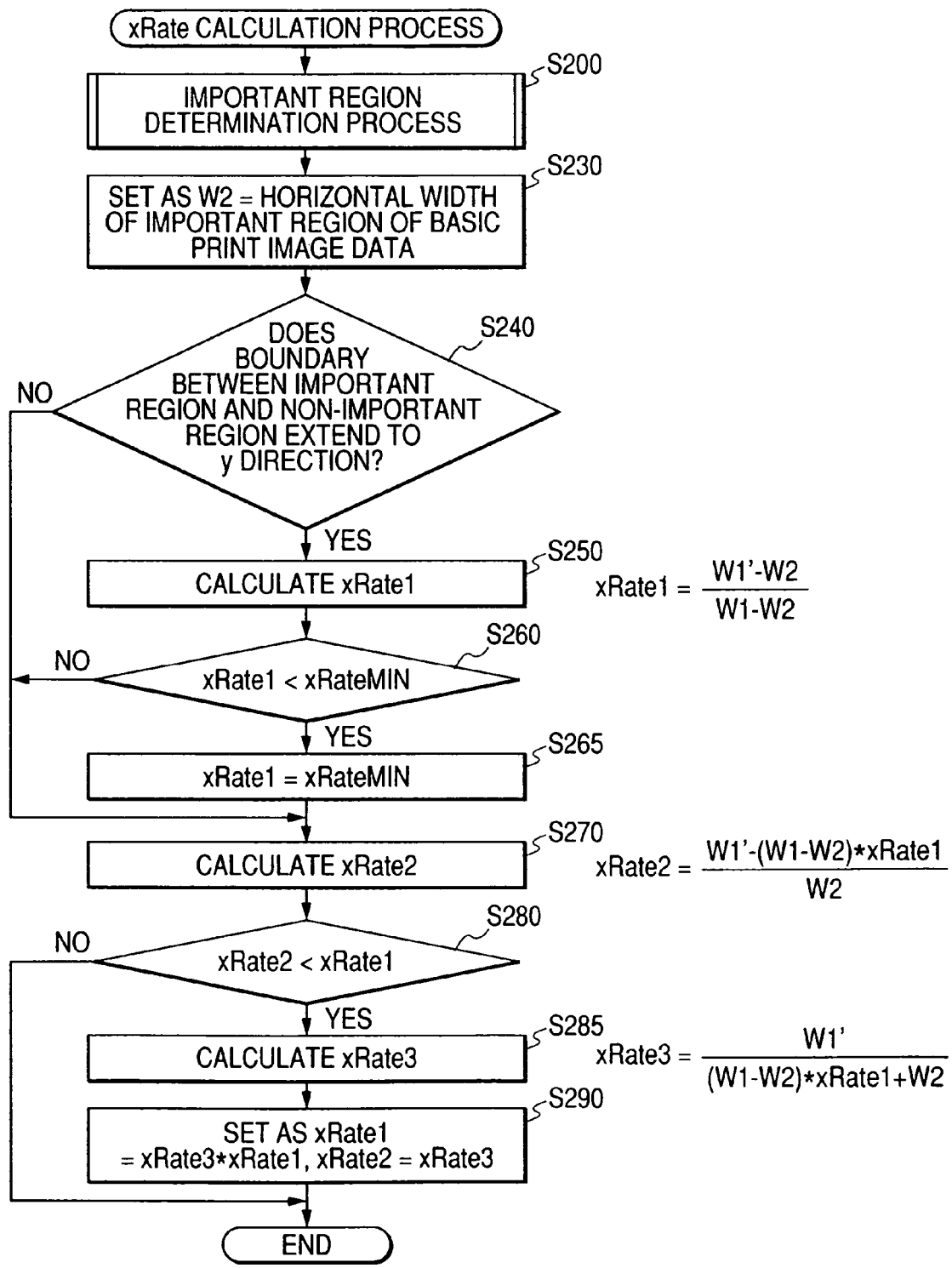
FIG. 19 is a flowchart illustrating an xRate calculation process executed by the CPU 131.
Figure 20:
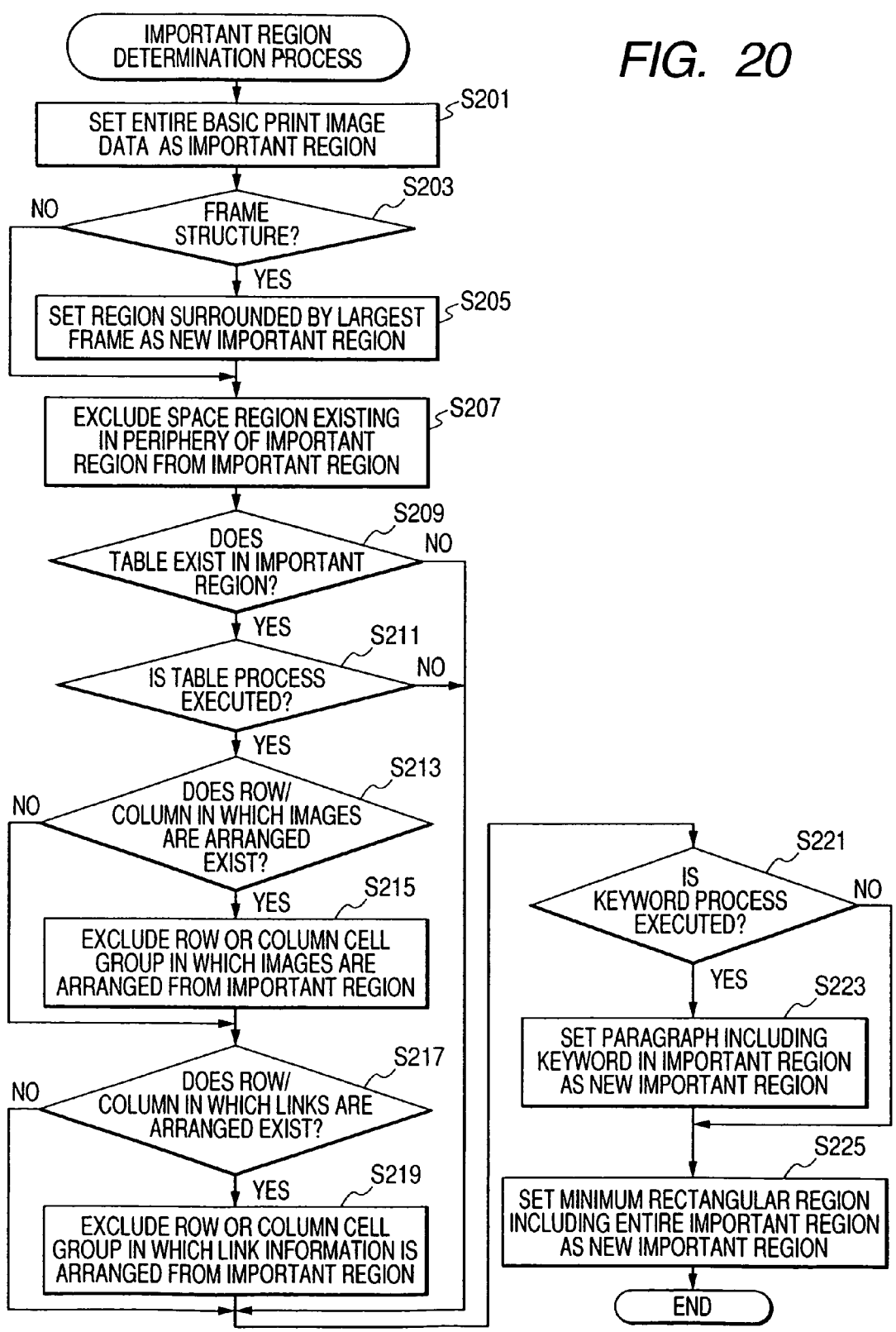
FIG. 20 is a flowchart illustrating an important region determination process executed by the CPU 131.
Figure 21:
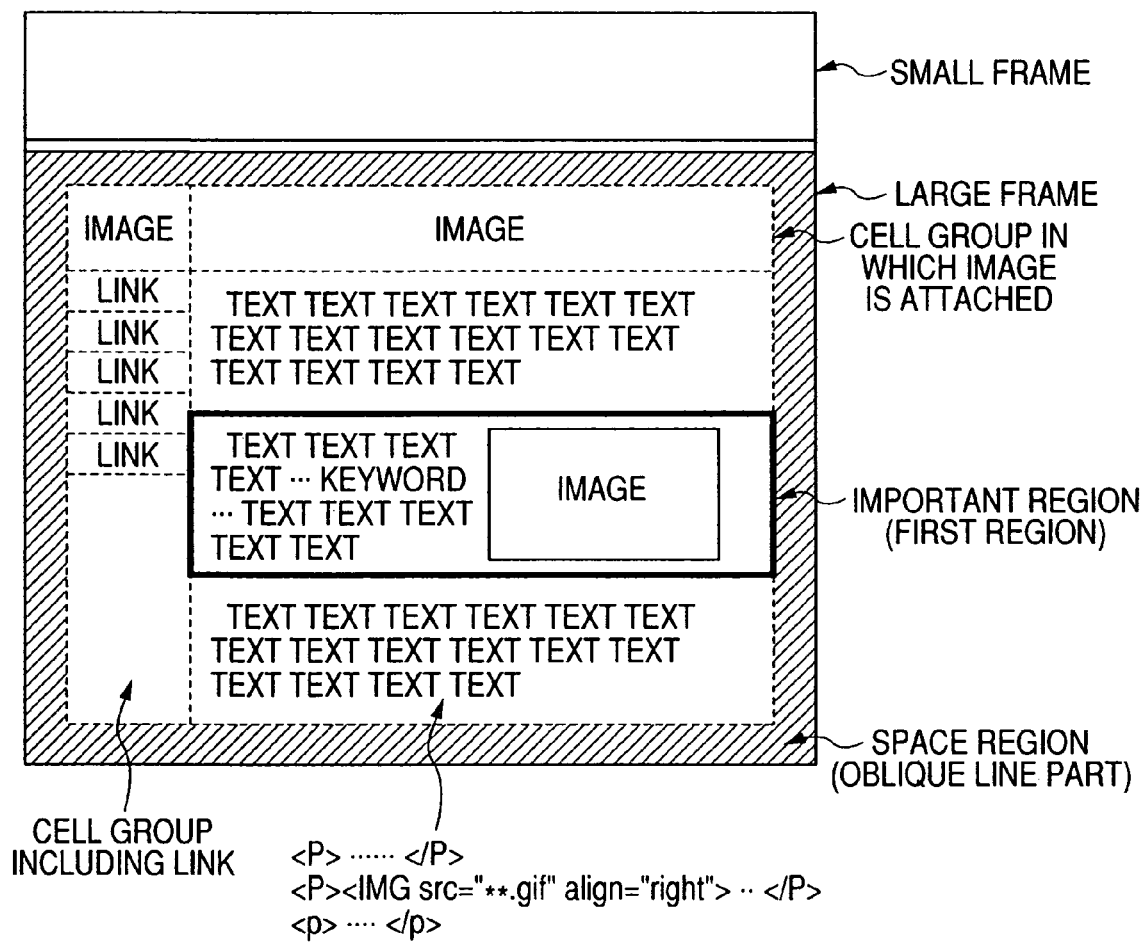
FIG. 21 is an explanatory view illustrating a method of determining the important region.

FIG. 19 is a flowchart illustrating the xRate calculation process executed by the CPU 131. If the xRate calculation process executed, first, the CPU 131 executes an important region determination process in step S200 as shown in FIG. 20. FIG. 20 is a flowchart illustrating the important region determination process executed by the CPU 131, and FIG. 21 is an explanatory view illustrating a method of determining an important region If the important region determination process is executed, the CPU 131 sets the entire basic print image data as the important region (S201). Then, the CPU 131 determines whether or not the HTML document includes a frame structure on the basis of contents described in the HTML document which is original data of the print image data (S203). In particular, the CPU 131 determines whether or not a frame exists in the HTML document.

If it is determined that the HTML document includes the frame structure (Yes in step S203), the CPU 131 proceeds to step S205 and sets a region, located within the basic print image data surrounded by a frame having the largest dimension of a surrounding region among a plurality of frames, to a new important region which substitutes for the predetermined important region. And then, the process proceeds to step S207. On the other hand, if it is determined that the HTML document does not include the frame structure (No in step S203), the process proceeds to step S207 without performing step S205.

If the process proceeds to step S207, the CPU 131 excludes a rectangular space region of an edge, existing along each edge of the important region in the currently determined important region, from the important region. If the space region does not exist, the CPU 131 does not execute this process.

If the process in step S207 is terminated, the CPU 131 determines whether or not a table exists in the important region in which the space region is excluded (S209). In particular, the CPU 131 determines whether or not a table based on a table tag exists in the important region.

If it is determined that the table does not exist, the CPU 131 proceeds to step S221. If it is determined that the table exists, the CPU 131 proceeds to step S211. If the CPU 131 proceeds to step S211, the CPU 131 acquires user instruction information indicating whether or not it is necessary to execute a table process (S213 to S219) from the operation unit 143 or the storage unit 141, and determines whether or not to execute the table process in accordance with the user instruction information. If it is determined not to execute the table process, the process proceeds to step S221. If it is determined to execute the table process, the process proceeds to step S213.

If the process proceeds to step S213, the CPU 131 determines whether or not a region in which cells, to which an image (image based on an image file linked by an image tag) is attached, are arranged in the vertical or horizontal direction exists in the table. If it is determined that the region in which the cells are arranged in the vertical or horizontal direction exists (Yes in step S213), the CPU 131 excludes the entire region in which the cells of the table are arranged in the vertical or horizontal direction, as non-important region, from the currently determined important region (S215). And then, the CPU 131 proceeds to step S217.

On the other hand, if it is determined that the region in which the cells are arranged in the vertical or horizontal direction does not exist (No in step S213), the CPU 131 proceeds to step S217 without executing the process of step S215.

If the CPU 131 proceeds to step S217, the CPU 131 determines whether or not a region in which cells having a link (information based on a link tag) are arranged in the vertical or horizontal direction exists in the table. If it is determined that the region in which the cells having the link are arranged in the vertical or horizontal direction exists (Yes in step S217), the CPU 131 excludes the entire region in which the cells having the link of the table are arranged in the vertical or horizontal direction, as non-important region, from the currently determined important region (S219), and then proceeds to step S221. On the other hand, if it is determined that the region in which the cells having the link are arranged in the vertical or horizontal direction does not exist in the table (No in step S217), the CPU 131 proceeds to step 3221 without executing the process of step S219.

If the CPU 131 proceeds to step S221, the CPU 131 acquires user instruction information indicating whether or not it is necessary to execute a keyword process (S223) from the operation unit 143 or the storage unit 141, and determines whether or not to execute the keyword process in accordance with the user instruction information. If the user instruction information is instruction information which indicates to execute the keyword process, it is considered that the user instruction information includes information on a keyword specified by the user.

If it is determined to execute the keyword process (Yes in step S221), the CPU 131 proceeds to step S223. The CPU 131 searches a paragraph including a keyword indicated by the user instruction information from a descriptive sentence of the HTML document corresponding to the currently determined important region and sets the region of the print image data indicating information on the paragraph including the keyword among the currently determined important region to a new important region which substitutes for the currently determined important region n. And then, the CPU 131 proceeds to step S225. In addition, if it is determined not to execute the keyword process in step S221, the CPU 131 proceeds to step S225 without executing the process in step S223.

If the process proceeds to step S225, the CPU 131 sets a minimum rectangular region including the currently determined entire important region to a new important region which substitutes for the determined important region. That is, the CPU 131 sets a minimum value of an x coordinate of the currently determined important region to xMIN, sets a maximum value of the x coordinate to xMAX, sets a minimum value of a y coordinate of the currently determined important region to yMIN, and sets a maximum value of the y coordinate to yMAX. As the rectangular region, a region combining the coordinate (x, y)=(xMIN, yMIN), the coordinate (x, y)=(xMAX, yMIN), the coordinate (x, y)=(xMAX, yMAX), and the coordinate (x, y)=(xMIN, yMAX) is set to the new important region which substitutes for the currently determined important region (S225). As such, if the process of step S225 is terminated, the CPU 131 terminates the important region determination process.

In addition, if the important region determination process is terminated in step S200, the CPU 131 proceeds to step S230, sets a horizontal width of the important region of the basic print image data to a parameter W2, and then determines whether or not a boundary between the important region and the non-important region of the basic print image data extends in the y (vertical) direction in a two-dimensional space (S240). In particular, here, if the coordinate x=xMIN which is an x directional end point (boundary between the important region and the non-important region) of the important region does not correspond to an x directional minimum coordinate of the basic print image data or if the coordinate x=xMAX which is an x directional end point of the important region does not correspond to an x directional maximum coordinate of the basic print image data, the CPU 131 determines that the boundary extends in the y (vertical) direction.

Further, if it is determined that the boundary extends in the y (vertical) direction (Yes in step S240), the process proceeds to step S250. If it is determined that the boundary does not extend in the y (vertical) direction (that is, the important region broadens out to the entire x (horizontal) direction, No in step S240), the process proceeds to step S270.

If the process proceeds to step S250, the CPU 131 calculates the value of the parameter xRate1 according to the following equation.

$$xRate1=(W1'-W2)/(W1-W2) \quad \text{Equation 1}$$

In addition, if the process of step S250 is terminated, the CPU 131 determines whether or not a value of the parameter xRate1 is less than the predetermined minimum value xRateMIN (S260). If it is determined that the value of the parameter xRate1 is less than the predetermined minimum value xRateMIN (Yes in step S260), the CPU 131 modifies the parameter xRate1 to the minimum value xRateMIN (S265). The minimum value xRateMIN is less than 1 and can be set, for example, to value 0.5. If the process of step S265 is terminated, the CPU 131 proceeds to step S270.

In addition, in step S260, if it is determined that the value of the parameter xRate1 is more than the predetermined minimum value xRateMIN (No in step S260), the CPU 131 proceeds to step S270 without executing the process of step S265.

It the process proceeds to step S270, the CPU 131 calculates a value of the parameter xRate2 according to the following equation.

$$xRate2=\{W1'-(W1-W2)*xRate1\}/W2 \quad \text{Equation 2}$$

Further, if the process of step S270 is terminated, the CPU 131 determines whether or not the value of the parameter xRate2 is less than the value of the parameter xRate1 (S280). However, if it is determined as No in step S240, the CPU 131 unconditionally determines as No in step S280.

Further, it is determined that the value of the parameter xRate2 is not less than the value of the parameter xRate1 (No in step S280), the corresponding xRate calculation process is terminated. If it is determined that the value of the parameter xRate2 is less than the value of the parameter xRate1 (Yes in step S280), calculate proceeds to step S285 and calculates a value of a parameter xRate3 according to the following equation.

$$xRate3=W1'/\{(W1-W2)*xRate1+W2\} \quad \text{Equation 3}$$

In addition, if the process of step S285 is terminated, the CPU 131 proceeds to step 8290 and sets the parameter xRate1 to a value (xRate1*xRate3) in which the current value of the parameter xRate1 is multiplied by the value of the parameter xRate3. In addition, the parameter xRate2 is set to the value of the parameter xRate3. And then, the corresponding xRate calculation process is terminated.

As described above, if the xRate calculation process is terminated in step S190, the CPU 131 proceeds to step S300 and determines whether or not the value of the parameter xRate1 calculated by the xRate calculation process is less than a second minimum value xRateMIN2 which is smaller than the predetermined minimum value xRateMIN. If it is determined that the value of the parameter xRate1 is less than the value of the second minimum value xRateMIN2, the CPU 131 proceeds to step S310 and determines whether or not the orientation of the specified paper is a portrait disposition.

If the orientation of the specified paper is the portrait disposition, a longer direction of the paper corresponds to the vertical (y) direction of the two-dimensional space set by the print image data. In addition, if the orientation of the specified paper is the landscape disposition, the longer direction of the paper corresponds to the horizontal (x) direction of the two-dimensional space set by the print image data.

In step S310, if it is determined that the orientation of the specified paper is the portrait disposition (Yes in step S310), the CPU 131 proceeds to step S320 and sets the orientation of the specified paper to the landscape disposition. And then, the CPU 131 proceeds to step S120 and executes processes of steps S120 to S300 with respect to the specified paper having the landscape disposition.

Figure 22:
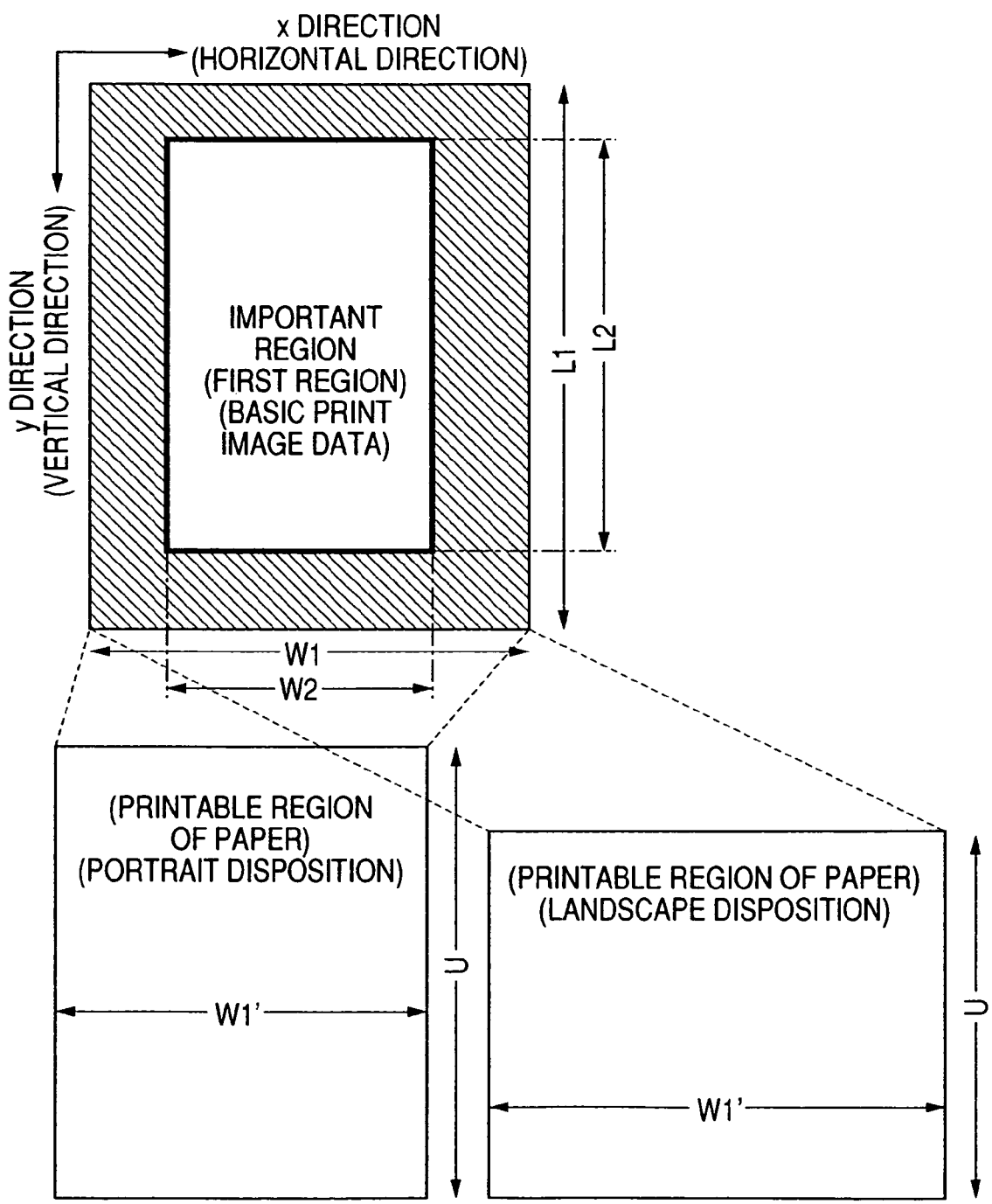
FIG. 22 is an explanatory view illustrating parameters W1, W2, L1, L2, and W1'.

In other words, if the specified paper is the portrait disposition type, as shown in FIG. 22, the width of the printable region of a shorter direction of the paper is set to the parameter W1' (S160). However, if the specified paper is the landscape disposition type, the width of the printable region of the longer direction of the paper is set to the parameter W1' (S160) and processes of steps 3170 to S300 are executed. FIG. 22 is an explanatory view illustrating a method of setting parameters W1, W2, L1, L2, and W1'.

In addition, if it is determined that the value of the parameter xRate1 is more than the minimum value xRateMIN2 (No in step S300) or the orientation of the specified paper is the landscape disposition (No in step S310), the CPU 131 proceeds to step S330 so as to set a vertical width of the printable region of the specified paper to a parameter U. In other words, in the case that the orientation of the specified paper is the portrait disposition as shown in FIG. 22, the width of the printable region of the longer direction of the specified paper is set to the parameter U. In the case that the orientation of the specified paper is the landscape disposition, the width of the printable region of the shorter direction of the specified paper is set to the parameter U.

If the process in step S330 is terminated, the CPU 131 proceeds to step S340 so as to determine whether or not the number of papers is specified from the user through the operation unit 143 when instructing the print. If it is determined that the number of papers is specified (Yes in step S340), the CPU 131 sets a value in which the value of the parameter U is multiplied by the specified number of papers (U*(the number of papers)) to the parameter L1' (S350) and then the proceeds to step 3390.

On the other hand, in step S340, if it is determined that the number of papers is not specified, the CPU 131 proceeds to step 3360 and determines whether or not the decimal places of a value (L1/U) in which the value of the parameter L1 is divided by the value of the parameter U is smaller than a predetermined amount. For example, in the case of L1/U=2.15, the CPU 131 determines whether or not the decimal places 0.15 is smaller than the predetermined amount. However, if the decimal place is zero, the CPU 131 exceptionally determines as 'No' in step S360.

Further, if it is determined that the decimal places is smaller than the predetermined value (Yes in step S360), the CPU 131 divides the value of the parameter L1 by the value of the parameter U, truncates the decimal places of the divided value (L1/U), and multiplies the value of parameter U to the divided value in which the decimal places is truncated, and sets the multiplied value to the parameter L1' (S370). For example, in the case of L1/U=2.15, the CPU 131 sets as L1'=2*U by using the value 2 in which the decimal places 0.15 is truncated.

The CPU 131 divides the value of the parameter L1 by the value of the parameter U, truncates the decimal places of the divided value (L1/U), and multiplies the value of parameter U to the divided value in which the decimal places is truncated, and sets the multiplied value to the parameter L1' so as to execute the reduction process with respect to the basic print image data such that an image inconsiderably printed on the paper of the last page can be disposed on an end of a previous page.

As such, if the process of step S370 is terminated, the CPU 131 proceeds to step 5390 and executes a yRate calculation process. On the other hand, in step S360, if it is determined that the decimal places of a value (L1/U) in which a value of the parameter L1 is divided by a value of the parameter U is more than the predetermined amount (No in step S360), the CPU 131 sets the value of the parameter L1 to the parameter L1' (S380) and proceeds to step S500.

Figure 23:
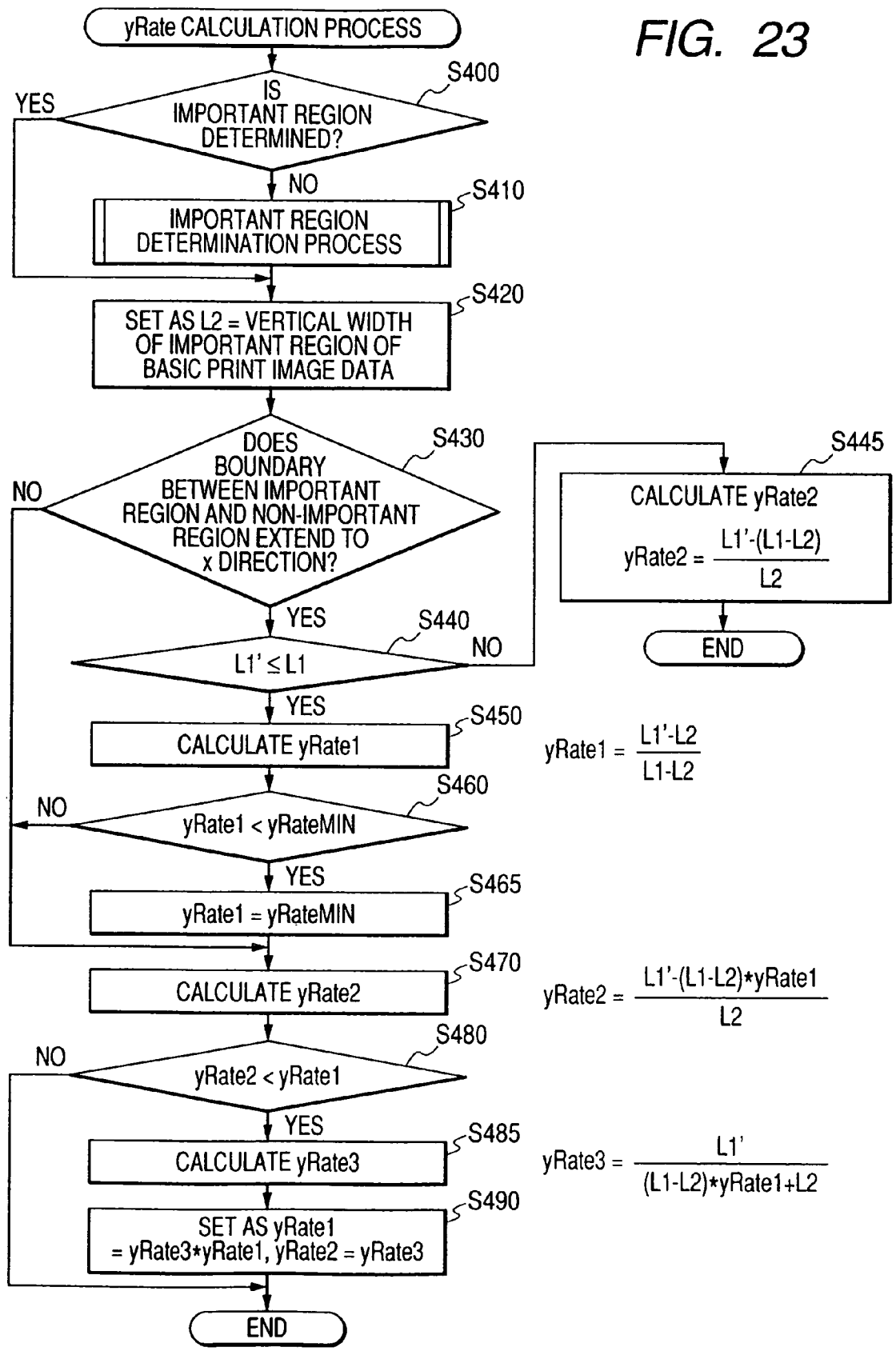
FIG. 23 is a flowchart illustrating a yRate calculation process executed by the CPU 131.

FIG. 23 is a flowchart illustrating the yRate calculation process executed by the CPU 131. It the yRate calculation process is executed, the CPU 131, first, determines whether or not the important region is determined beforehand by the important region determination process (S400). In particular, here, the CPU 131 executes the xRate calculation process in advance and determines if the important region determination process is simultaneously executed. If the xRate calculation process is not executed, it is determined as 'No' in step S400. If the xRate calculation process is executed, it is determined as 'Yes' in step S400.

If it is determined as 'No' in step S400, the CPU 131 proceeds to step S410 and executes the important region determination process shown in FIG. 20. Thereafter, the CPU 131 proceeds to step S420. On the other hand, if it is determined as 'Yes' in step S400, the CPU 131 proceeds to step S420 without executing the process of step S410.

If the process proceeds to step S420, the CPU 131 sets a vertical width of the important region of the basic print image data to the parameter L2 and determines whether or not the boundary between the important region and the non-important region of the basic print image data extends in the x (horizontal) direction in the two-dimensional space (S430). In particular, the coordinate y=yMIN of the y directional end point (boundary between the important region and the non-important region) of the important region does not correspond to the y directional minimum coordinate of the basic print image data or the coordinate y=yMAX of the y directional end point of the important region does not correspond to the y directional maximum coordinate of the basic print image data, it is determined that the boundary extends in x (horizontal) direction.

Further, if it is determined that the boundary extends in the x (horizontal) direction (Yes in step S430), the process proceeds to step S440. On the other hand, if it is determined that the boundary does not extend in the x (horizontal) direction (that is, the important region broadens to the entire y (vertical) direction, No in step S430), the process proceeds to step S470.

If the process proceeds to step S440, the CPU 131 determines whether or not the predetermined value of the parameter L1' is less than or equal to the value of the parameter L1 indicating the vertical width of the basic print image data. If it is determined that the value of the parameter L1' is not less than or equal to the value of the parameter L1 (No in step S440), the CPU 131 proceeds to step S445 and calculates a value of the parameter yRate2 according to the following equation. Thereafter, the yRate calculation process is terminated.

$$rRate2=\{L1'-(L1-L2)\}/L2 \qquad \text{Equation 4}$$

On the other hand, if it is determined that the value of the parameter L1' is less than or equal to the value of the parameter L1 in step S440, the CPU 131 proceeds to step S450 and calculates a value of the parameter yRate1 according to the following equation.

$$yRate1=(L1'-L2)/(L1-L2) \qquad \text{Equation 5}$$

In addition, if the process of step S450 is terminated, the CPU 131 determines whether or not the value of the parameter yRate1 is less than the predetermined minimum value yRateMIN (S460). If it is determined that the value of the parameter yRate1 is less than the predetermined minimum value yRateMIN (Yes in step S460), the parameter yRate1 is set to the minimum value yRateMIN (S465). The minimum value yRateMIN is less than to 1 and can be set, for example, to value 0.5. If the process of step S465 is terminated, the CPU 131 proceeds to S470.

Besides, in step S460, if it is determined that the value of the parameter yRate1 is more than the predetermined minimum value yRateMIN (No in step S460), the CPU 131 proceeds to step S470 without executing the process of step S465. If the process is proceeds to the step S470, the CPU 131 calculates a value of the parameter yRate2 according to the following equation.

$$yRate2=\{L1'-(L1-L2)*yRate1\}/L2 \qquad \text{Equation 6}$$

If this process is terminated, the CPU 131 determines whether or not the value of the parameter yRate2 is less than the value of the parameter yRate1 (S480). However, if it is determined as 'No' in step S430, the CPU 131 unconditionally determines as 'No' in step S480. If it is determined that the value of the parameter yRate2 is not less than the value of the parameter yRate1 (No in step S480), the CPU 131 terminates the yRate calculation process. If it is determined that the value of the parameter yRate2 is less than the value of the parameter yRate1 (Yes in step S480), the CPU 131 calculates a value of a parameter yRate3 according to the following equation (S485).

$$yRate3=L1'/\{(L1-L2)*yRate1+L2\} \qquad \text{Equation 7}$$

In addition, if the process of step S485 is terminated, the CPU 131 proceeds to step S490 and sets a value (yRate1*yRate3) in which a current value of the parameter yRate1 is multiplied by a value of the parameter yRate3 to the parameter yRate1. In addition, the CPU 131 sets the value of the parameter yRate3 to the parameter yRate2 and terminates the yRate calculation process.

Figure 24:
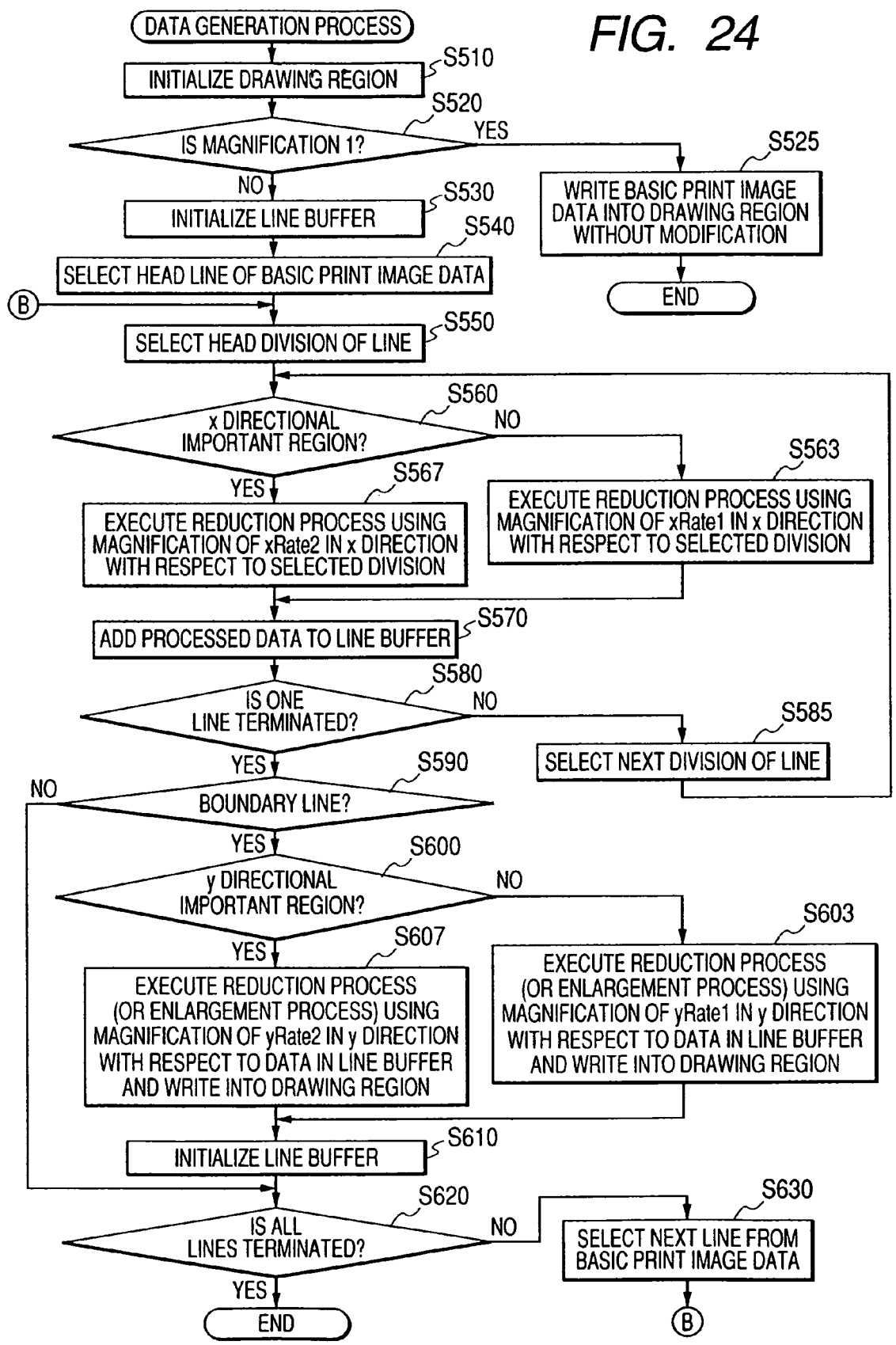
FIG. 24 is a flowchart illustrating a data generation process executed by the CPU 131.

If the yRate calculation process is terminated in step S390, the CPU 131 executes a data generation process as shown in FIG. 24 in next step S500. FIG. 24 is a flowchart illustrating the data generation process executed by the CPU 131.

If the data generation process is executed, the CPU 131 secures a drawing region for storing data output to the printer device 110 in the RAM 135, performs initialization (S510), and determines whether or not all of the values of the parameter xRate1, the parameter xRate2, the parameter yRate1, and the parameter yRate2 are 1 (xRate1=xRate2=yRate1=yRate2=1) (S520).

If it is determined that all of the values of the parameter xRate1, the parameter xRate2, the parameter yRate1, and the parameter yRate2 are 1 (Yes in step S520), the CPU 131 determines that the basic print image data generated in step S110 as the data output to the printer device 110, and writes the corresponding data to the drawing region. Thereafter, the corresponding data generation process is terminated.

On the other hand, if it is determined that all of the values of the parameter xRate1, the parameter xRate2, the parameter yRate1, and the parameter yRate2 are not 1 (No in step S520), the CPU 131 proceeds to step S530 and initializes a line buffer. The line buffer is realized by a memory control program executed by the CPU 131 and the RAM 135. The line buffer delimits and stores input data with respect to a line (image data corresponding to one row) having a length corresponding to the horizontal width of the printable region of the specified paper.

If the process of step S530 is terminated, the CPU 131 proceeds to step S540 and selects a head line (line of the head) of the basic print image data as a processing object line.

Further, the CPU 131 selects a head division of the processing object line to a data processing object in step S550.

Figure 25:
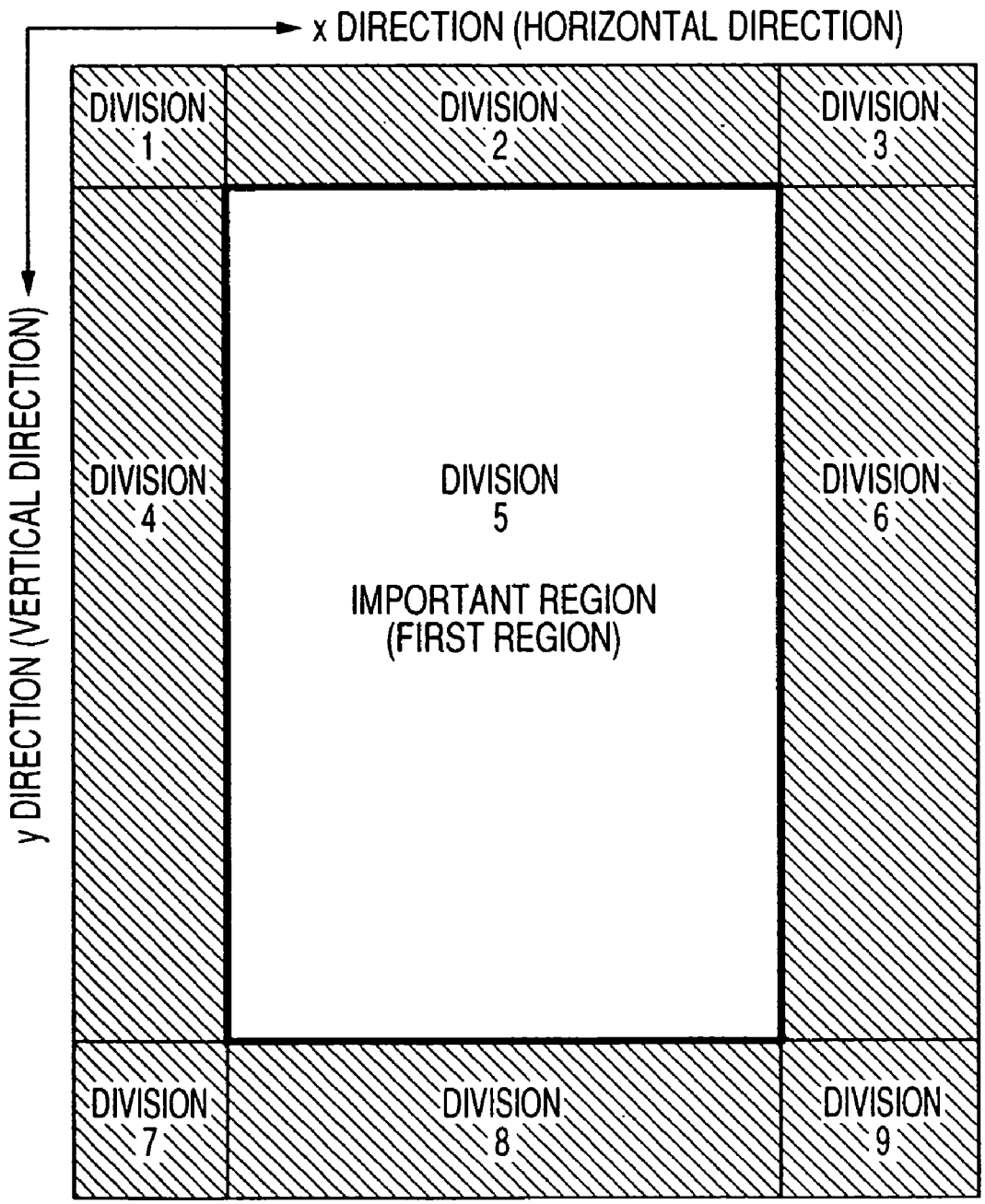
FIG. 25 is an explanatory view illustrating an example of division.

In the illustrative aspect, when executing the reduction process for data (row data) of each line in the x direction, the data of each line is divided into an x directional important region and non-important region excluding the important region and the reduction process is executed with respect to each of the divisions. The x directional important region is a region of the basic print image data in which the x coordinate is located in a range from x coordinate minimum value xMIN to the maximum value xMAX of the important region. FIG. 25 is an explanatory view illustrating an example of the division. In the example shown in FIG. 25, since a division 5 is the important region, divisions 2, 5, and 8 become the x directional important regions, In addition, in the case of the example shown in FIG. 25, data existing in divisions 1, 4, and 7 among the data of the processing object line are selected as the data processing object in step S550.

If the process of the step S550 is terminated, the CPU 131 proceeds to step S560 and determines whether or not the data processing object exists in the x directional important region.

If it is determined that the data processing object does not exist in the x directional important region in step s560, the CPU 131 proceeds to step S563, performs the reduction process for the data processing object in the x direction by using magnification xRate1, and writes the reduced data processing object to the line buffer (S570). On the other hand, if it is determined that the data processing object exists in the x directional important region (Yes in step s560), the CPU 131 proceeds to step S567, performs the reduction process for the data processing object in the x direction by using magnification xRate2, and writes the reduced data processing object to the line buffer (S570). The reduction process in the x direction is realized by skipping pixel data of the division of the data processing object in accordance with the magnification rate and converting the number of pixels of the data processing object into the number of pixels corresponding to xRate1 or xRate2 times.

If the process of step S570 is terminated, the CPU 131 proceeds to step S580, determines whether or not all of the divisions of the processing object line has been selected as the data processing object. If it is determined that all of the divisions of the processing object line has not been selected as the data processing object (No in step S580), the CPU 131 selects data existing in next division (in the case that the data processing object exists in the divisions 1, 4, and 7, the divisions 2, 5, and 8 correspond to the next division, or in the case that the data processing object exists in the divisions 2, 5, and 8, the divisions 3, 6, and 9 correspond to the next division) which is adjacent to the data processing object of the processing object line in the x direction as a new data processing object (S585). Thereafter, the CPU 131 proceeds to step 3560 and determines whether or not the data processing object exists in the x directional important region. If it is determined that the data processing object does not exist in the x directional important region, the CPU 131 executes the reduction process for the data processing object in the x direction by using the magnification of xRate1 and writes the processed data processing object in the line buffer (S570). If it is determined that the division of the data processing object exists in the x directional important region, the CPU 131 executes the reduction process for the data processing object in the x direction by using the magnification of xRate2 and writes the processed data processing object in the line buffer (S570).

If it is determined that all of the divisions of the processing object line are selected as the data processing object (Yes in step S580), the CPU 131 determines whether or not the boundary between the important region and the non-important region exists between the current processing object line and the next line of the basic print image data (S590). However, in the case that the processing object line is the last line of the basic print image data, the CPU 131 exceptionally determines as Yes in step S590.

In the illustrative aspect, when executing the reduction (or enlargement) process for the basic print image data in the y direction, the data of each line is respectively divided into a y directional important region and a non-important region and the reduction (or enlargement) process is executed with respect to each of the divisions. However, the decision in step S590 is executed to realize this reduction (or enlargement) process. The y directional important region is a region of the basic print image data, in which the y coordinate is located in a range from y coordinate minimum value yMIN to the maximum value yMAX of the important region. In the example shown in FIG. 25, since the division 5 is the important region, divisions 4, 5, and 6 become the y directional important region.

Further, if it is determined that the corresponding boundary exists (Yes in step S590), the CPU 131 determines whether or not the processing object line exists in the y directional important region (S600). If it is determined that the processing object line does not exist in the y directional important region (No in step S600), the CPU 131 executes the reduction (or enlargement) process for the data to be stored by the line buffer in the y direction by using the magnification yRate1 and writes the processed data in the drawing region (S603).

On the other hand, if it is determined that the processing object line exists in the y directional important region (Yes in step S600), the CPU 131 proceeds to step S607, executes the reduction (or enlargement) process for the data to be stored by the line buffer in the y direction by using the magnification yRate2, and writes the processed data in the drawing region. The reduction process in the y direction is executed when the parameter yRate1 and yRate2 are less than 1, and is realized by skipping the data to be stored by the line buffer in the line unit in accordance with the magnification rate and setting the number of lines (the number of pixels in the y direction) to be yRate1 or yRate2 times. On the other hand, the enlargement process in the y direction is executed when the parameter yRate1 and yRate2 are more than 1, and is realized by copying a part of the data to be stored by the line buffer in the line unit and setting the number of lines to be yRate1 or yRate2 times.

If the processes of step S603 and step S607 are terminated, the CPU 131 newly initializes the line buffer (S610), and then proceeds to step S620. On the other hand, if it is determined that the boundary does not exist in step S590 (No in step S590), the CPU 131 proceeds to step S620 without executing the processes of step S600 to S610.

If the CPU 131 proceeds to step S620, the CPU 131 selects all of the lines of the basic print image data to the processing object line and determines whether or not the above described processes have been executed. If it is determined that the all of the lines are not selected as the processing object line (No in step S620), the CPU 131 selects next line of the current processing object line of the basic print image data to new processing object line (S630), proceeds to step S550, and executes the above described processes subsequent to step S550. On the other hand, if it is determined that all of the lines of the basic print image data are selected as the processing object line in step S620, the corresponding data generation process is terminated.

If the data generation process is terminated as described above, the CPU 131 treats the data stored in the drawing region as the print image data of an output object, executes predetermined output procedures, inputs print image data of the output object to the printer device 110 through the interface 149, and forms an image on the specified paper based on the print image data input to the printer device 110 (S640). Thereafter, the print process for the corresponding HTML document is terminated.

Until now, the print system 101 has been described. However, if the print instruction is input, the PC 120 converts the display image data of the HTML document specified by the print instruction into the print image data (basic print image data) such that the printer device 110 can form an image (S110), and determines whether or not the horizontal width W1 of the basic print image data is less than or equal to the horizontal width W1' of the printable region (S170).

If it is determined that the horizontal width W1 of the basic print image data is not less than or equal to the horizontal width W1' of the printable region (No in step S170), the CPU 131 determines the x directional reduction rate xRate1 of the non-important region of the basic print image data and the x directional reduction rate xRate2 of the important region of the basic print image data such that the ratio thereof (xRate1/xRate2) becomes less than 1 while being more than the value xRateMIN (S190). Accordingly, the PC 120 executes the reduction process for the non-important region in the horizontal (x) direction prior to the important region in the data generation process or step S500 so as to converts the HTML document into the print image data having the horizontal width less than or equal to the horizontal width W1' of the printable region.

In particular, in the case that the important region broadens to the entire horizontal direction (that is, W1=W2) in the basic print image data, the PC 120 determines as No in step S240, sets xRate2=W1'/W1, executes the reduction process for the entire basic print image data including the important region which broadens to the entire horizontal direction to the width W1' in the horizontal direction, and converts the basic print image data into the print image data of the horizontal width W1'. In addition, in the case that the important region does not broaden to the entire horizontal direction in the basic print image data, the PC 120 determines as Yes in step S240, determines the parameter xRate1 or xRate2 as described above, makes the non-important region smaller than the important region, and converts the basic print image data to the print image data of the horizontal width W1'.

Consequently, if the printer device 110 outputs an image on the basis of the basic print image data, the print system 101 according to the illustrative aspect can dispose the image on the printable region even though the image (document) is not fixed in the printable region. In addition, since the print system 101 preferentially executes the reduction process with respect to the non-important region in the document, the process can be terminated without reducing the important region (or, the rate of reduction with respect to the important region can be less than the non-important region). The print system 101 can print the document in the important region by the printer device 110 such that the user can easily read the document.

In addition, according to the print system 101, since the horizontal directional reduction rate (xRate1/xRate2) of the non-important region with respect to the important region is restricted to be more than the predetermined value xRateMIN, it is possible to prevent the print image corresponding to the non-important region from being excessively reduced and to print the image such that contents corresponding to the non-important region can be understood.

Further, the print system 101 according to the illustrative aspect, in the case of performing the print by using a common method (L1'=L1), determines whether or not the print image is formed much more than the predetermined amount on the last page so as to determine whether or not the reduction process in the vertical (y) direction is necessary (S360). If the reduction process is necessary (Yes in step S360), the print system 101 calculates the y directional reduction rate yRate1 of the non-important region of the basic print image data and the y directional reduction rate yRate2 of the important region of the basic print image data by using the yRate calculation process (S390), and converts the HTML document into the print image data in which the vertical width becomes width L1' based on the vertical width U of the printable region that the printer device 110 can print the HTML document on the paper by using the data generation process (S500).

In particular, in the case that the important region broadens to the entire vertical direction (that is, L1=L2) in the basic print image data, the PC 120 determines as No in step S430, sets yRate2=L1'/L1, executes the reduction process for the entire basic print image data including the important region which broadens to the entire vertical direction, up to the width L1' in the vertical direction, and converts the vertical width of the basic print image data into the print image data of vertical width L1'.

In addition, in the case that the important region does not broaden to the entire vertical direction in the basic print image data, the PC 120 determines as Yes in step S430, determines the values of the parameter yRate1 and the parameter yRate2 such that the rate thereof (yRate1/yRate2) becomes less than 1 when determining the parameter yRate1 and the parameter yRate2 in steps subsequent to step S450, executes the reduction process for the non-important region in the vertical direction prior to the important region in step S500, and converts the basic print image data to the print image data on the vertical width L1'.

Consequentially, according to the print system 101, when the printer device 110 performs the print by using the basic print image data, it is possible to solve the problem that the paper cost rises because of few images formed on the last page. In addition, since the reduction process is executed for the non-important region in the vertical direction prior to the important region, it is possible to prevent that the user cannot easily read the important region after the print. As a result, it is possible to provide a printed matter that the user can easily read.

In addition, according to the print system 101, since the vertical directional reduction rate (yRate1/yRate2) of the non-important region with respect to the important region is restricted to be more than the predetermined value yRateMIN, it is possible to prevent the print image corresponding to the non-important region from being excessively reduced even though the print image is reduced in the vertical direction and it is also possible to print the HTML document by using the printer device 110 such that the contents corresponding to the non-important region can be understood.

Besides, according to the print system 101, since the HTML document can be printed by the printer device 110 while considering the region including a predetermined keyword in the HTML document as the important region, it is possible to easily read the region including the keyword in the print image.

In addition, according to the print system 101, since the important region is determined by excluding the region in which a link is arranged in the HTML document, it is possible to print the HTML document such that the user can easily read the corresponding document. Besides, since a frame which has the largest display area in the HTML document is set as the important region and the information included in the corresponding frame is printed larger than information included in other frames during the print, it is possible to print the HTML document such that the user can easily read necessary information.

The first conversion unit is realized by the process of step S110 executed by the CPU 131 and the size determination unit is realized by the process of step S170. In addition, the necessity determination unit is realized by the process of step S360, In addition, the determination unit is realized by the important region determination process executed by the CPU 131, the second conversion unit is realized by the xRate calculation process, yRate calculation process, and the data generation process. In addition, the horizontal region determination unit is realized by the process of step S240 and the vertical region determination unit is realized by the process of step S430.

Besides, in the case that it is determined as Yes in step S170 and determined as No in step S360, the output unit determines as Yes in step 3520, writes the basic print image data to the drawing region, and outputs the basic print image data (S640). In the case that it is determined as No in step S170 and determined as Yes in step S360, the basic print image data is output after the reduction process written in the drawing region is executed.

In addition, the image processing apparatus, the program for the same, and the method of outputting the two-dimensional image data are not limited to the above-described illustrative aspect, and various modification can be made to the respective illustrative aspects.

Figure 26:
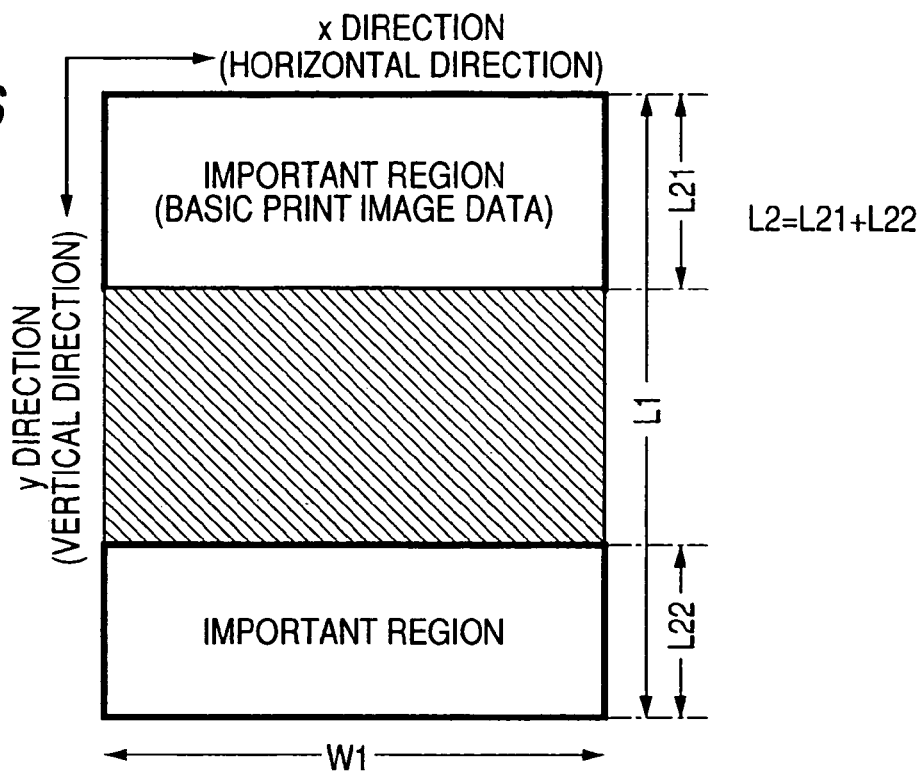
FIG. 26 is an explanatory view illustrating a method of determining the important region according to another illustrative aspect.
Figure 27:
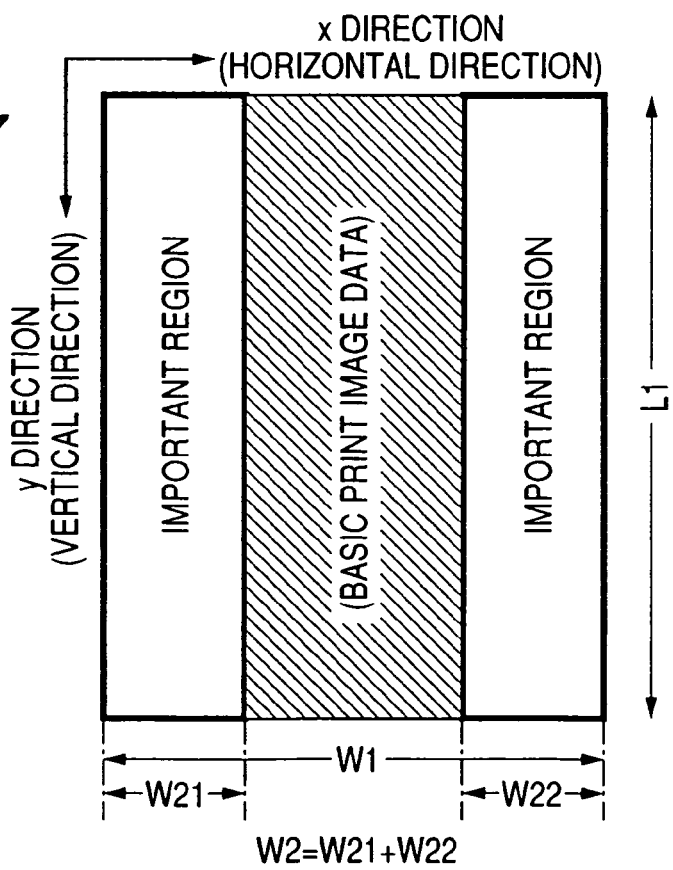
FIG. 27 is an explanatory view illustrating a method of determining the important according to another illustrative aspect.

For example, in the important region determination process, a plurality of regions including the non-important region can be determined as the important region. FIGS. 26 and 27 are explanatory views illustrating a method of determining the important region according to another illustrative aspect.

In step S200 and step S410, in the case that the plurality of regions vertically divided as shown in FIG. 26 is determined as the important region, if the sum of vertical widths L21 and L22 of each important region is set to a parameter L2, it is possible to generate print image data suitable for the printable region in the same way as in above-described illustrative aspect.

Besides, in step S200 and step S410, in the case that the plurality of regions horizontally divided as shown in FIG. 27 is determined to the important region, if the sum of horizontal widths W21 and W22 of each important region is set to a parameter W2, it is possible to generate print image data suitable for the printable region in the same way as in above-described illustrative aspect.

Further, in the above-described illustrative aspect, the basic print image data is generated and then the important region determination process is executed. However, after arbitrarily assuming a configuration of the basic print image data on the basis of the HTML document and executing the main process such as the important region determination process, the print image data of the output object can be directly generated from the HTML document to the drawing region.

According to the illustrative aspect, the image processing apparatus includes a size determination unit that determines whether or not a horizontal width of the two-dimensional image data converted by the first conversion unit is less than or equal to a horizontal width based on specifications predetermined in accordance with the capability of the image forming apparatus. In addition, the image processing apparatus includes a determination unit that determines an important region within the specified document.

According to the illustrative aspect, in a case where the size determination unit determines that the horizontal width of the two-dimensional image data converted by the first conversion unit is not less than or equal to the horizontal width based on the specifications, a second conversion unit executes a reduction process for a region (non-important region), excluding the important region determined by the determination unit, within the specified document in a horizontal direction prior to the important region, and converts the specified document into two-dimensional image data having a horizontal width less than or equal to the horizontal width based on the specifications.

Besides, an output unit outputs the two-dimensional image data generated by the first conversion unit as input data to the image forming apparatus in a case where the size determination unit determines that the horizontal width of the two-dimensional image data converted by the first conversion unit is less than or equal to the horizontal width based on the specifications, and outputs the two-dimensional image data generated by the second conversion unit as input data to the image forming apparatus in a case where the size determination unit determines that the horizontal width of the two-dimensional image data converted by the first conversion unit is not less than or equal to the horizontal width based on the specifications.

According to the image processing apparatus configured as described above, in a case where the first conversion unit converts the document into the two-dimensional image data across the entire regions with the same scale without dividing the important region and the non-important region, in the case that the horizontal width of the two-dimensional image data is more than the horizontal width based on the specifications, the second conversion unit preferentially executes the reduction process for the non-important region, generates two-dimensional image data having the horizontal width less than or equal to the horizontal width based on the specifications, and outputs an image on the basis of this two-dimensional image data. Accordingly, in a case where the image forming apparatus outputs an image on the basis of the two-dimensional image data generated by the first conversion unit, it is possible to dispose the image within the horizontal width based on the specifications by using the two-dimensional image data generated by the second conversion unit even when the image (document) is not fixed within the horizontal width based on the specifications.

In particular, since the image processing apparatus preferentially executes the reduction process for the non-important region in the document, the important region is not reduced (or, the important region is slightly reduced) and thus it is possible to display an image formed by the image forming apparatus such that a user can easily read the important region thereof.

In the above-described horizontal width based on the specifications, a designer can determines a value corresponding to a width of the horizontal direction that the image forming apparatus can form the image. In the case that the image forming apparatus can form the image by using a paper having one of the plurality of sizes (for example, A4 size or letter size), the horizontal width based on the specifications can be set to every size of the paper.

That is, in the case of the image forming apparatus capable of forming the image on a paper having a plurality of sizes, the size determination unit can determine whether or not a horizontal width of two-dimensional image data converted by the first conversion unit is less than or equal to the horizontal width based on the specifications suitable for the paper used when the image forming apparatus forms the image.

In addition, the determination unit can determine the important region and the non-important region in accordance with operation information of a user or determine the important region by analyzing the document.

In addition, since the layout of the document can be changed in accordance with each document, there is a possibility that the important region will occupy the entire horizontal direction of the two-dimensional image data. Accordingly, in this case, it is preferable to prepare the second conversion unit, which will be described later, so as to form the two-dimensional image data.

In the image processing apparatus, the second conversion unit may include a horizontal region determination unit that determines whether or not the important region broadens to an entire horizontal direction of the two-dimensional image data in the two-dimensional image data converted by the first conversion unit. In a case where the horizontal region determination unit determines that the important region does not broaden to the entire horizontal direction of the two-dimensional image data, the reduction process for the region excluding the important region within the specified document in the horizontal direction is executed prior to the important region. In a case where the horizontal region determination unit determines that the important region broadens to the entire horizontal direction of the two-dimensional image data, the reduction process for the important region, which broadens to the entire horizontal direction, in the horizontal direction is executed and the specified document is converted into the two-dimensional image data having the horizontal width less than or equal to the horizontal width based on the specifications.

According to the image processing apparatus, it is possible to convert the specified document into the two-dimensional image data having the horizontal width less than or equal to the horizontal width based on the specifications even when the important region broadens to the entire horizontal direction of the two-dimensional image data.

However, in the case that the two-dimensional image data converted by the first conversion unit greatly exceeds the horizontal width based on the specifications, if any reduction process is not performed, the reduction process for the non-important region may be excessively executed. Accordingly, the reduction rate of the horizontal direction of the non-important region with respect to the important region should be restricted to be more than a predetermined value.

Further, in the image processing apparatus, preferably, the second conversion unit holds a reduction rate of the horizontal direction of the region, excluding the important region, within the specified document with respect to the important region to be more than a predetermined value and converts the specified document into two-dimensional image data having the horizontal width less than or equal to the horizontal width based on the specifications. According to the image processing apparatus, since the reduction rate of the horizontal direction of the non-important region with respect to the important region is restricted to be more than the predetermined value, it is possible to prevent the image corresponding to the non-important region formed by the image forming apparatus from being excessively reduced. In addition, the image forming apparatus can forms the image such that contents corresponding to the non-important region can be understood.

The above-described illustrative aspects can be applied to a case of disposing the document in which the image is formed across a plurality of papers on one page when the image forming apparatus forms the image on the basis of the two-dimensional image data converted by the first conversion unit or a case of disposing a document in which the image is inconsiderably printed on the paper of the last page on a previous page when the image is formed across the plurality of papers in the document.

Further, the image processing apparatus may include a necessity determination unit that determines whether or not the reduction process in a vertical direction is necessary on the basis of a vertical width of the two-dimensional image data converted by the first conversion unit. In addition, in a case where the necessity determination unit determines that the reduction process in the vertical direction is necessary, the second conversion unit executes the reduction process for the region excluding the important region within the specified document in the vertical direction prior to the important region and converts the specified document into two-dimensional image data having a vertical width less than or equal to a vertical width based on the specifications predetermined in accordance with the capability of the image forming apparatus.

In addition, in a case where the size determination unit determines that the horizontal width of the two-dimensional image data converted by the first conversion unit is less than or equal to the horizontal width based on the specifications and the necessity determination unit determines that the reduction process in the vertical direction is not necessary, the output unit outputs the two-dimensional image data generated by the first conversion unit as input data to the image forming apparatus, and in a case where the size determination unit determines that the horizontal width of the two-dimensional image data converted by the first conversion unit is not less than or equal to the horizontal width based on the specifications or the necessity determination unit determines that the reduction process in the vertical direction is necessary, the output unit outputs the two-dimensional image data generated by the second conversion unit as input data to the image forming apparatus.

According to the image processing apparatus, in a case in which an undesirable process is performed at the time of image formation, for example, only a few images are formed on the paper of the last page when the image forming apparatus forms the image by using the two-dimensional image data converted by the first conversion unit, it is possible to solve the above-described problem by setting the two-dimensional image data generated by the second conversion unit as the input data to the image forming apparatus.

In particular, according to the image processing apparatus, since the reduction process is executed for the non-important region in the vertical direction, it is possible to prevent the important region in the document from being difficult to be read by the user after the print. It is also possible to easily read the important region compared with other regions. It is possible to provide an image (document) suitable for the user.

As a vertical width based on the specifications, a designer may determine a value corresponding to a width of the vertical direction of the paper in which the image forming apparatus can form the image. In the case that the image forming apparatus can form the image with paper having a plurality of sizes, it is preferable to set the vertical width based on the specifications for every size of the paper in the same manner as for the horizontal width.

That is, in a case where the second conversion unit determines that the reduction process of the vertical direction is necessary by using the necessity determination unit, the second conversion unit executes the reduction process for the region (non-important region) excluding the important region in the specified document in the vertical direction prior to the important region. The second conversion unit converts the specified document into the two-dimensional image data having a vertical width less than or equal to the vertical width based on the specifications in which the vertical width is suitable for the paper used when the image forming apparatus forms the image.

In addition, since the layout of the document can be changed in accordance with each document, there is a possibility that the important region will occupy the entire vertical direction of the two-dimensional image data. Accordingly, in this case, it is preferable to prepare the second conversion unit, which will be described late, so as to form the two-dimensional image data.

Furthermore, in the image processing apparatus, the second conversion unit may include a vertical region determination unit that determines whether or not the important region broadens to an entire vertical direction of the two-dimensional image data in the two dimensional image data converted by the first conversion unit. In a case where the necessity determination unit determines that the reduction process in the vertical direction is necessary and the vertical region determination unit determines that the important region does not broaden to the entire vertical direction of the two-dimensional image, the reduction process for the region excluding the important region within the specified document in the vertical direction is executed prior to the important region. In a case where the necessity determination unit determines that the reduction process in the vertical direction is necessary and the vertical region determination unit determines that the important region broadens to the entire vertical direction of the two-dimensional image, the reduction process for the important region, which broadens to the entire vertical direction, in the vertical direction is executed and the specified document is converted into the two-dimensional image data having a vertical width less than or equal to the vertical width based on the specifications.

The image processing apparatus can convert the specified document into the two-dimensional image data having a vertical width less than or equal to the horizontal width based on the specifications even when the important region broadens to the entire vertical direction of the two-dimensional image data.

In addition, in the case of conversion by the second conversion unit, if the reduction rate of the vertical direction of the non-important region with respect to the important region is not restricted, the reduction process of the non-important region may be excessively executed. Accordingly, the reduction rate of the vertical direction of the non-important region with respect to the important region should be restricted to be more than a predetermined value.

Furthermore, in the image processing apparatus, the second conversion unit may hold a reduction rate of the vertical direction of a region, excluding the important region within the specified document, with respect to the important region to be more than a predetermined value and converts the specified document into two-dimensional image data having the vertical width less than or equal to the horizontal width based on the specifications. According to the image processing apparatus, since the reduction rate of the vertical direction of the non-important region with respect to the important region is restricted to be more than the predetermined value, the image forming apparatus can also form the image so that contents of the non-important region can be understood.

In addition, the invention is not limited to the image processing apparatus described above but can be applied to another image processing device.

According to another illustrative aspect, an image processing apparatus includes a first conversion unit that converts a document specified by an external command into two-dimensional image data with which an image forming apparatus can form an image, a necessity determination unit, a determination unit, a second conversion unit, and an output unit.

In the image processing apparatus, the second conversion unit executes a reduction process for a region, excluding the important region determined by the determination unit, within the specified document in a vertical direction prior to the important region, and converts the specified document into two-dimensional image data in which a vertical width is less than or equal to the vertical width based on specifications predetermined in accordance with the capability of the image forming apparatus in a case where the necessity determination unit determines that the reduction process is necessary.

In addition, the output unit outputs the two-dimensional image data generated by the first conversion unit as input data to the image forming apparatus in a case where the necessity determination unit determines that the reduction process is not necessary, and outputs the two-dimensional image data generated by the second conversion unit as input data to the image forming apparatus in a case where the necessity determination unit determines that the reduction process is necessary. According to the image processing apparatus, it is possible to obtain the same effects as in the image processing apparatus described above.

Further, in the image processing apparatus, it is preferable that the determination unit of the image processing apparatus determines a region including a predetermined keyword within the specified document as the important region. According to the image processing apparatus constructed above, it is possible to suitably select the important region by setting an important word as the keyword and thus to display the region including the keyword to be easily read.

Furthermore, the image processing apparatus may include a keyword set unit which sets the keyword on the basis of the information input through an operation unit that the user can operate such that the user can easily modify the keyword.

In addition, since web page may include a plurality of link information which is necessary during the web surfing but not necessary during the print, a region in which the link information is disposed can be determined as the non-important region.

In the image processing apparatus, it is assumed that the specified document is described by a markup language including link information, and the determination unit determines a region, excluding a region in which a plurality of information is disposed in vertical and horizontal directions in the two-dimensional image data converted by the first conversion unit, as the important region.

According to the image processing apparatus, a region in which link information of the two-dimensional image data is disposed (in other words, a region in which link information is disposed on the image formed on the basis of the two-dimensional image data) is determined as non-important region and the other regions are determined as the important region. Since the reduction process is preferentially executed for the non-important region, it is possible that the image forming apparatus forms the two-dimensional image data such that the user can easily read the important region except for the non-important region.

In the document described by the markup language such as the HTML document, a document having the frame structure which divides a screen into a plurality of screens and displays the divided screen exists. In the case that the specified document is described by the roarkup language having the frame structure, the determination unit can be configured as below.

In the image processing apparatus, the determination unit may determine the region surrounded by the main frame of the two-dimensional image data converted by the first conversion unit as the important region. The main frame is a frame displaying main information among a plurality of frames existing in the document. The main frame can be, for example, a frame having the largest display region among the plurality of frames, a frame having the largest document amount, or a frame on which information displaying the main frame is attached.

According to the image processing apparatus, since the second conversion unit generates the two-dimensional image data while considering the main frame as the important region, it is possible to display the information such that the user can easily read necessary information when the image forming apparatus forms the image on the basis of the two-dimensional image data.

The image processing apparatus described above can be configured by executing a program, which causes a computer to execute functions as the above-described units, on the computer (CPU) serving as the PC or a control device of the image forming device.

According to another illustrative aspect, there is provided a program causing a computer to execute functions as the first conversion unit, the size determination unit, the determination unit, the second conversion unit, and the output unit of the image processing apparatus described above. If this program is executed in the computer, it is possible to configure the image processing apparatus described above.

Furthermore, according to another illustrative aspect, there is provided a program causing a computer to execute functions as the first conversion unit, the size determination unit, the determination unit, the second conversion unit, the output unit, and the necessity determination unit of the image processing apparatus described above. It this program is executed in the computer, it is possible to configure the image processing apparatus described above.

In addition, according to another illustrative aspect, there is provided a program causing a computer to execute functions as the first conversion unit, the necessity determination unit, the determination unit, the second conversion unit, and the output unit of the image processing apparatus described above. If this program is executed in the computer, it is possible to configure the image processing apparatus described above.

In the program described above, the determination unit may determine a region including a predetermined keyword within the specified document as the important region. If this program is executed in the computer, it is possible to configure the image processing apparatus described above.

In addition, in the program described above, the specified document may be described by a markup language including link information, and the determination unit determines a region, excluding a region in which a plurality of information is disposed in a vertical or horizontal direction in the two-dimensional image data converted by the first conversion unit, as the important region. If this program is executed in the computer, it is possible to configure the image processing apparatus described above.

In addition, in the program described above, the specified document may have a frame structure described by a markup languages and the determination unit determines a region surrounded by a main frame in the two-dimensional image data converted by the first conversion unit as the important region. If this program is executed in the computer, it is possible to configure the image processing apparatus described above.

According to another illustrative aspect, a method of outputting two-dimensional image data includes the steps of: (A) converting a document specified by an external command into two-dimensional image data with which an image forming apparatus can form an image; (B) determining whether or not a horizontal width of the two-dimensional image data converted by step (A) is less than or equal to a horizontal width based on specifications predetermined in accordance with the capability of the image forming apparatus; (C) determining an important region within the specified document; (D) executing a reduction process for a region excluding the important region determined in step (C) in the specified document in a horizontal direction prior to the important region, and converting the specified document into two-dimensional image data having a horizontal width less than or equal to the horizontal width based on the specifications in a case where it is determined that the horizontal width of the two-dimensional image data converted in step (A) is not less than or equal to the horizontal width based on the specifications in step (B); and (E) outputting the two-dimensional image data generated in step (D) as input data to the image forming apparatus in a case where it is determined that the horizontal width of the two-dimensional image data converted in step (A) is less than or equal to the horizontal width based on the specifications in step (B), and outputs the two-dimensional image data generated in step (A) as input data to the image forming apparatus if it is determined that the horizontal width of the two-dimensional image data converted in step (A) is not less than or equal to the horizontal width based on the specifications in step (B).

What is claimed is:

1. An information processing apparatus comprises:
a display unit displaying an image;
an input unit inputting a command in accordance with an external operation;
an image data acquiring unit acquiring print image data for a print image comprising a plurality of pages from an application;
a preview display processing unit displaying on the display unit a first print preview image of the print image data acquired by the image data acquiring unit, the first preview image comprising a plurality of pages corresponding to the print image;
a selection region display processing unit capable of selecting a plurality of regions from the plurality of pages of the first print preview image displayed on the display unit by the preview display processing unit and displaying the selected regions so as to be identified on the display unit, on the basis of the command in accordance with the input external operation;
an image data processing unit creating a new print preview image of one page, and arranging each of the selected regions on the new print preview image; and
a print instructing unit instructing a print unit to print the new print preview image.

2. The information processing apparatus according to claim 1, wherein the image data processing unit creates a second print preview image in which an image in a particular selected region of the first print preview image is deleted.

3. The information processing apparatus according to claim 1, wherein the image data processing unit creates a third print preview image in which an image except for an image in a particular selected region of the first print preview image is deleted.

4. The information processing apparatus according to claim 3, wherein the image data processing unit changes a printing size of the third print preview image.

5. A non-transitory computer readable storage medium readable by a computer, to execute as, the display unit, the input unit, the image data acquiring unit, the preview display processing unit, the selection region display processing unit, the image data processing unit, and the print instructing unit of the information processing apparatus according to claim 1.

6. A storage medium readable by a computer, the storage medium storing a program of instructions executable by the computer to perform a function for image data processing, the function, comprising:

inputting a command in accordance with an external operation;

acquiring print image data for a print image comprising a plurality of pages from an application;

displaying a print preview image of the acquired print image data on a display unit, the print preview image comprising a plurality of pages corresponding to the print image;

selecting a plurality of regions from the plurality of pages of the print preview image displayed on the display unit;

displaying the selected regions so as to be identified on the display unit, on a basis of a command in accordance with an external operation input by an input unit;

performing an image processing process for creating a new print preview image of one page, and arranging each of the selected regions on the new print preview image; and instructing a print unit to print the new print preview image.

7. An information processing method, comprising:

inputting a command in accordance with an external operation;

acquiring print image data for a print image comprising a plurality of pages from an application;

displaying a first print preview image of the print image data, the first print preview image comprising a plurality of pages corresponding to the print image;

selecting a plurality of regions from the plurality of pages of the displayed first print preview image;

displaying the selected regions so as to be identified, on the basis of the command in accordance with the input external operation;

creating a new print preview image of one page, and arranging each of the selected regions on the new print preview image; and instructing a print unit to print the new print preview image.

8. A method of outputting two-dimensional image data, comprising:

(A) converting a document specified by an external command into two-dimensional image data with which an image forming apparatus can form an image;

(B) determining whether or not a reduction process is necessary on the basis of a vertical width of the two-dimensional image data converted by the first conversion unit;

(C) determining an first region within the specified document;

(D) executing a reduction process for a region excluding the first region determined in step (C) in the specified document in a vertical direction prior to the first region, and converting the specified document into two-dimensional image data in which a vertical width is less than or equal to a vertical width predetermined in accordance with a capability of the image forming apparatus in a case where it is determined that the reduction process is necessary in step (B); and (E) outputting the two-dimensional image data generated in step (A) as input data to the image forming apparatus if the reduction process is not determined to be necessary in step (B), and (F) outputting the two-dimensional image data generated in step (D) as input data to the image forming apparatus if the reduction process is determined to be necessary in step (B).

9. An image processing apparatus comprising:

a first conversion unit converting a document specified by an external command into two-dimensional image data with which an image forming apparatus can form an image;

a size determination unit that determines whether or not a horizontal width of the two-dimensional image data is less than or equal to a horizontal width predetermined in accordance with a capability of the image forming apparatus;

a determination unit that determines a first region within the specified document;

a second conversion unit that, if the size determination unit determines that the horizontal width of the two-dimensional image data is not less than or equal to the predetermined horizontal width, reduces in a horizontal direction, prior to the first region, a second region within the specified document excluding the first region, and converts the specified document into two-dimensional image data having a horizontal width less than or equal to the predetermined horizontal width; and an output unit that outputs the two-dimensional image data generated by the first conversion unit as input data to the image forming apparatus if the size determination unit determines that the horizontal width of the two-dimensional image data converted by the first conversion unit is less than or equal to the predetermined horizontal width, and outputs the two-dimensional image data generated by the second conversion unit as input data to the image forming apparatus if the size determination unit determines that the horizontal width of the two-dimensional image data converted by the first conversion unit is not less than or equal to the predetermined horizontal width.

10. The image processing apparatus according to claim 9, wherein the second conversion unit comprises a horizontal region determination unit that determines whether or not the first region broadens in the two-dimensional image data converted by the first conversion unit with respect to an entire horizontal direction of the converted two-dimensional image data, if the horizontal region determination unit determines that the first region does not broaden with respect to the entire horizontal direction of the converted two-dimensional image data, the second region is reduced in the horizontal direction, prior to the first region, and if the horizontal region determination unit determines that the first region broadens with respect to the entire horizontal direction of the converted two-dimensional image data, the broadened first region is reduced in the horizontal direction, and the specified document is converted into a two-dimensional image data having the horizontal width less than or equal to the predetermined horizontal width.

11. The image processing apparatus according to claim 9, wherein the second conversion unit holds a reduction rate of the horizontal direction of the second region with respect to the first region to be equal to or more than a predetermined value, and wherein the second conversion unit converts the specified document into two-dimensional image data having the horizontal width less than or equal to the predetermined horizontal width.

12. The image processing apparatus according to claim 9, further comprising:

a necessity determination unit that determines whether or not a reduction process in a vertical direction is necessary on the basis of a vertical width of the two-dimensional image data converted by the first conversion unit, wherein, if the necessity determination unit determines that the reduction process in the vertical direction is necessary, the second conversion unit reduces in a vertical direction, prior to the first region, the second region excluding the first region within the specified document and converts the specified document into two-dimensional image data having a vertical width less than or equal to a vertical width predetermined in accordance with a capability of the image forming apparatus, and if the size determination unit determines that the horizontal width of the two-dimensional image data converted by the first conversion unit is less than or equal to the predetermined horizontal width and if the necessity determination unit determines that the reduction process in the vertical direction is not necessary, the output unit outputs the two-dimensional image data generated by the first conversion unit as input data to the image forming apparatus, and if the size determination unit determines that the horizontal width of the two-dimensional image data converted by the first conversion unit is not less than or equal to the predetermined horizontal width or if the necessity determination unit determines that the reduction process in the vertical direction is necessary, the output unit outputs the two-dimensional image data generated by the second conversion unit as input data to the image forming apparatus.

13. The image processing apparatus according to claim 12, wherein the second conversion unit comprises a vertical region determination unit that determines whether or not the first region broadens in the two dimensional image data converted by the first conversion unit with respect to an entire vertical direction of the two-dimensional image data, if the necessity determination unit determines that the reduction process in the vertical direction is necessary and if the vertical region determination unit determines that the first region does not broaden with respect to the entire vertical direction of the two-dimensional image, the reduction process in the vertical direction with respect to the second region except is executed prior to the first region, and if the necessity determination unit determines that the reduction process in the vertical direction is necessary and if the vertical region determination unit determines that the first region broadens with respect to the entire vertical direction of the two-dimensional image, the reduction process in the vertical direction with respect to the broadened first region is executed and the specified document is converted into the two-dimensional image data having a vertical width less than or equal to the predetermined vertical width.

14. The image processing apparatus according to claim 12, wherein the second conversion unit holds a reduction rate of the vertical direction of the second region, with respect to the first region to be equal to or more than a predetermined value and converts the specified document into two-dimensional image data having the vertical width less than or equal to the predetermined horizontal width.

15. A non-transitory computer readable storage medium readable by a computer, to execute functions as the first conversion unit, the size determination unit, the determination unit, the second conversion unit, the output unit, and the necessity determination unit of the image processing apparatus according to claim 12.

16. The image processing apparatus according to claim 9, wherein the determination unit determines a region including a predetermined keyword within the specified document as the first region.

17. A non-transitory computer readable storage medium readable by a computer, to execute functions as the first conversion unit, the necessity determination unit, the determination unit, the second conversion unit, and the output unit of the image processing apparatus according to claim 16.

18. The image processing apparatus according to 9, wherein the specified document is described by a markup language including link information, and the determination unit determines a region except for a region in which a plurality of information is disposed in a vertical or horizontal direction in the two-dimensional image data converted by the first conversion unit, as the first region.

19. The image processing apparatus according to claim 9, wherein the specified document has a frame structure described by a markup language, and the determination unit determines a region surrounded by a main frame in the two-dimensional image data converted by the first conversion unit as the first region.

20. A non-transitory computer readable storage medium readable by a computer, to execute functions as the first conversion unit, the size determination unit, the determination unit, the second conversion unit, and the output unit of the image processing apparatus according to claim 9.

21. A non-transitory computer readable storage medium readable by a computer according to claim 20, wherein the determination unit determines a region including a predetermined keyword within the specified document as the first region.

22. The image processing apparatus according to claim 9, wherein, when the second conversion unit reduces in a horizontal direction the second region, the second conversion unit maintains a positional relationship between the first region and the second region.

23. The image processing apparatus according to claim 9, wherein the two-dimensional image data indicates a rectangular image.

24. A method of outputting two-dimensional image data, comprising:

(A) converting a document specified by an external command into two-dimensional image data with which an image forming apparatus is configured to form an image;

(B) determining whether or not a horizontal width of the two-dimensional image data converted by step (A) is less than or equal to a horizontal width predetermined in accordance with a capability of the image forming apparatus;

(C) determining a first region within the specified document;

(D) executing a reduction process for a region excluding the first region determined in step (C) in the specified document in a horizontal direction prior to the first region, and converting the specified document into two-dimensional image data having a horizontal width less than or equal to the predetermined horizontal width if the horizontal width of the two-dimensional image data converted in step (A) is determined to be not less than or equal to the predetermined horizontal width;

(E) outputting the two-dimensional image data generated in step (D) as input data to the image forming apparatus if the horizontal width of the two-dimensional image data converted in step (A) is determined to be less than or equal to the predetermined horizontal width; and (F) outputting the two-dimensional image data generated in step (A) as input data to the image forming apparatus if the horizontal width of the two-dimensional image data converted in step (A) is determined to be not less than or equal to the predetermined horizontal width.

25. A non-transitory computer readable storage medium according to claim 24, wherein the specified document is described by a markup language including link information, and the determination unit determines a region, excluding a region in which a plurality of information is disposed in a vertical or horizontal direction in the two-dimensional image data converted by the first conversion unit, as the first region.

26. A non-transitory computer readable storage medium according to claim 24, wherein the specified document has a frame structure described by a markup language, and the determination unit determines a region surrounded by a main frame in the two-dimensional image data converted by the first conversion unit as the first region.

27. An image processing apparatus comprising:

a first conversion unit that converts a document specified by an external command into two-dimensional image data with which an image forming apparatus is configured to form an image;

a necessity determination unit that determines whether or not a reduction process is necessary on the basis of a vertical width of the two-dimensional image data converted by the first conversion unit;

a determination unit that determines a first region within the specified document;

a second conversion unit that reduces in a vertical direction, prior to the first region, a second region excluding the first region within the specified document and converts the specified document into two-dimensional image data in which a vertical width is less than or equal to a vertical width predetermined in accordance with a capability of the image forming apparatus if the necessity determination unit determines that the reduction process is necessary; and an output unit that outputs the two-dimensional image data generated by the first conversion unit as input data to the image forming apparatus if the necessity determination unit determines that the reduction process is not necessary, and outputs the two-dimensional image data generated by the second conversion unit as input data to the image forming apparatus if the necessity determination unit determines that the reduction process is necessary.

* * * * *